США005185659A

United States Patent [19]

Itagaki et al.

[11] Patent Number: 5,185,659

[45] Date of Patent: Feb. 9, 1993

[54] COLOR IMAGE READING APPARATUS HAVING COMMON CIRCUITRY FOR THE COLOR COMPONENT SIGNALS

[75] Inventors: Hiroshi Itagaki, Tokyo; Nobuo Matsuoka, Yokohama, both of Japan

[73] Assignee: Canon Kabushiki Kaisha, Tokyo, Japan

[21] Appl. No.: 731,076

[22] Filed: Jul. 16, 1991

Related U.S. Application Data

[63] Continuation of Ser. No. 400,109, Aug. 29, 1989, Pat. No. 5,038,207.

[30] Foreign Application Priority Data

Aug. 31, 1988 [JP] Japan .................. 63-214879
Aug. 31, 1988 [JP] Japan .................. 63-214880

[51] Int. Cl.⁵ .............................................. H04N 9/07
[52] U.S. Cl. ......................................... 358/44; 358/41; 358/75
[58] Field of Search ...................... 358/75–80, 358/41–44, 494, 93

[56] References Cited

U.S. PATENT DOCUMENTS

| | | | |
|---|---|---|---|
| 4,631,582 | 12/1986 | Nagasaki et al. | 358/42 |
| 4,638,352 | 1/1987 | Noda et al. | 358/44 |
| 4,774,566 | 9/1988 | Kawamura et al. | 358/75 |
| 4,839,719 | 6/1989 | Hirota et al. | 358/75 |
| 4,860,092 | 8/1989 | Hieder | 358/41 |
| 4,862,286 | 8/1989 | Suda et al. | 358/75 |
| 4,866,513 | 9/1989 | Takahashi | 358/80 |
| 4,887,150 | 12/1989 | Chiba et al. | 358/80 |
| 4,891,690 | 1/1990 | Hasegawa et al. | 358/75 |
| 5,038,207 | 8/1991 | Itagaki et al. | 358/75 |

FOREIGN PATENT DOCUMENTS

| | | |
|---|---|---|
| 2538660 | 7/1984 | France . |
| 57-138280 | 8/1982 | Japan . |
| 57-145492 | 9/1982 | Japan . |
| 61-021524 | 1/1986 | Japan . |
| 2155273 | 9/1985 | United Kingdom . |

Primary Examiner—James J. Groody
Assistant Examiner—Michael Lee
Attorney, Agent, or Firm—Fitzpatrick, Cella, Harper & Scinto

[57] ABSTRACT

A color image reading apparatus includes reading circuitry for reading a color image and dot sequentially outputting a plurality of color component signals. Common amplifying circuitry is provided for sequentially amplifying the plurality of analog color component signals which are dot sequentially output from the reading circuitry. Common converting circuitry is provided for sequentially converting the plurality of color component signals, which are amplified by the common amplifying circuitry, into a plurality of digital color component signals. Separating circuitry is provided for separating the plurality of digital color component signals, which are converted by the common converting circuitry, into digital color component signals of each color. Finally, switching circuitry is provided for sequentially switching a gain of the amplifying circuitry in accordance with a color of the analog color signal to be amplified.

11 Claims, 18 Drawing Sheets

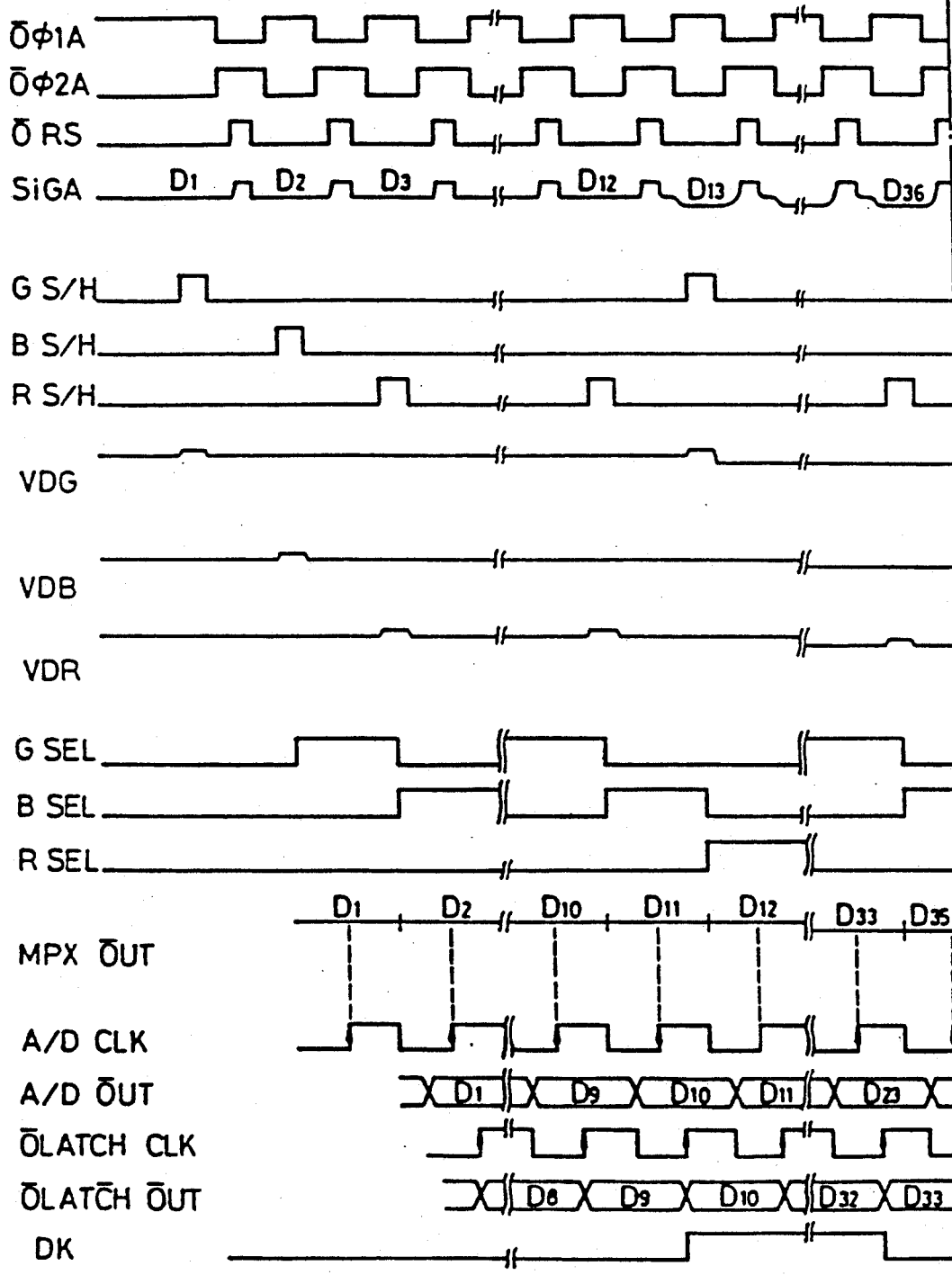

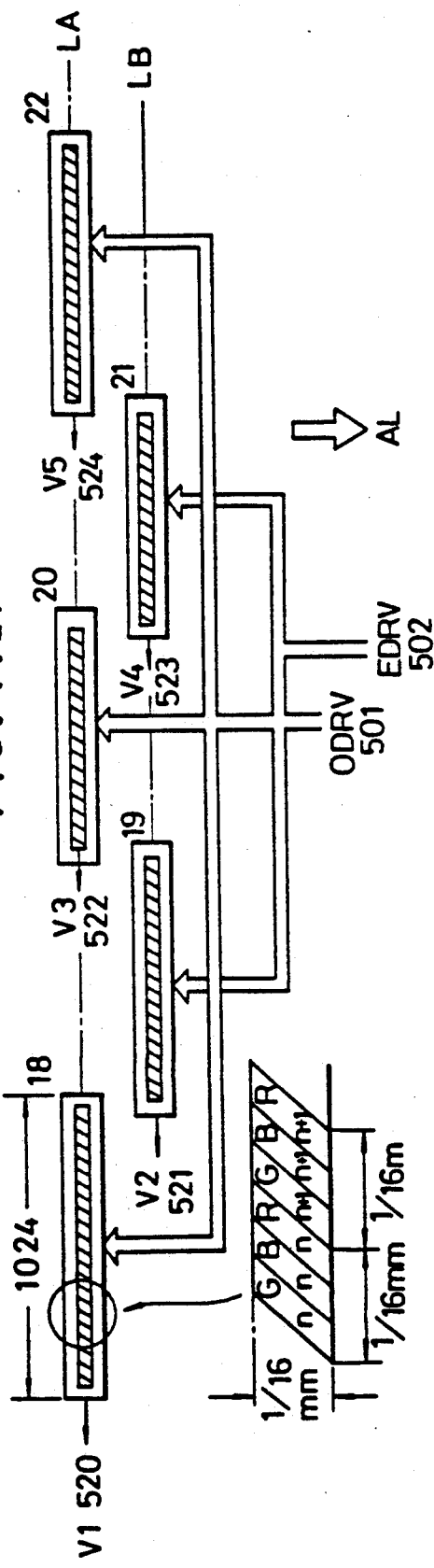
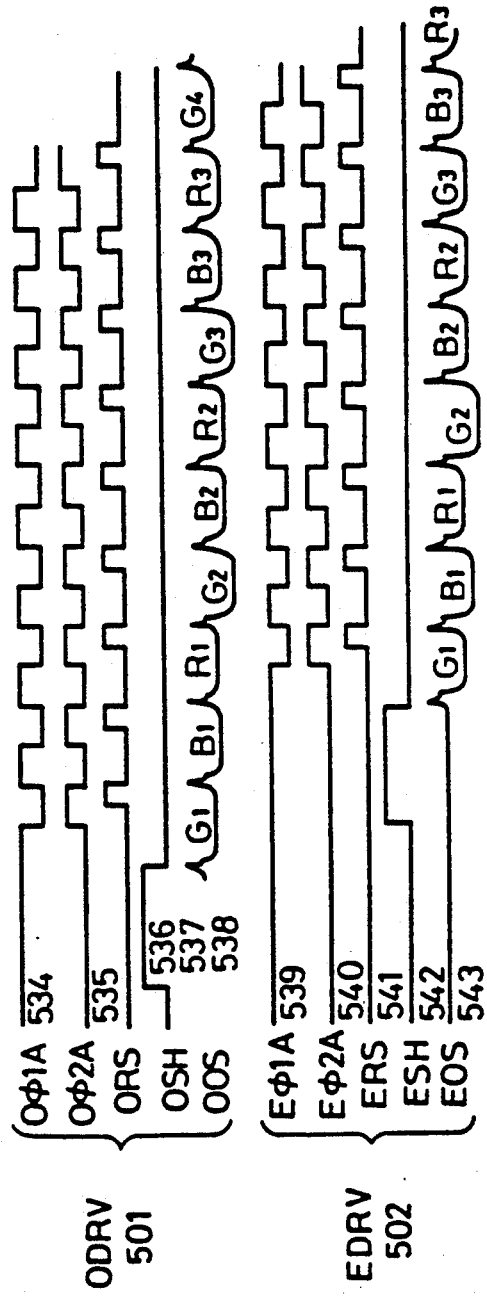
FIG. 4(a)
FIG. 4(b)

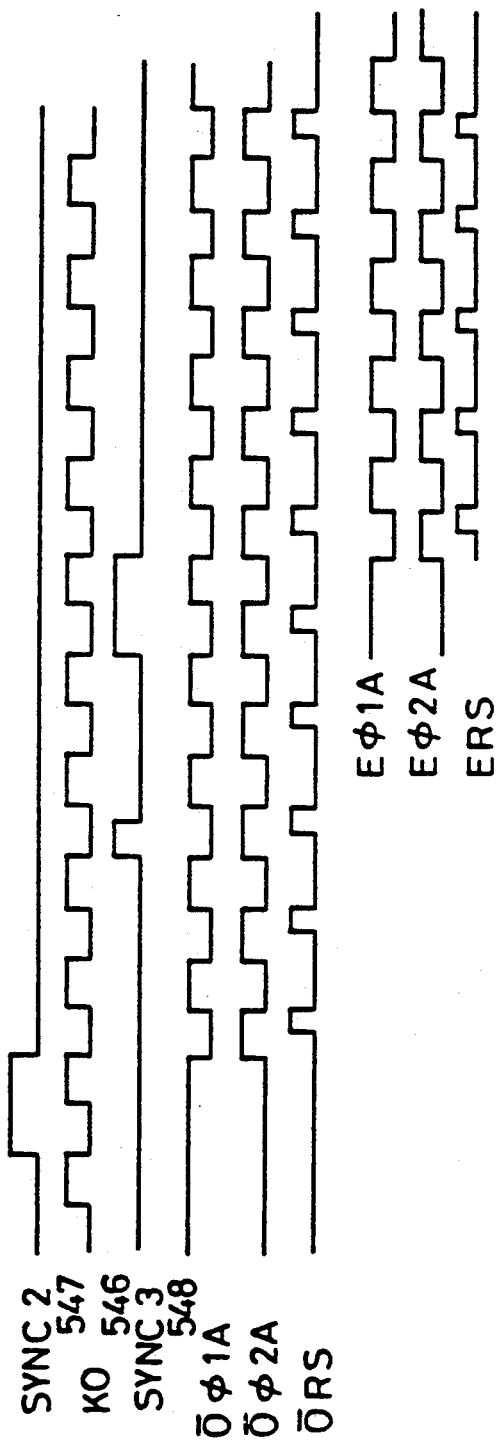

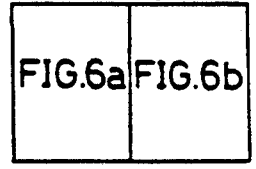
FIG.6a
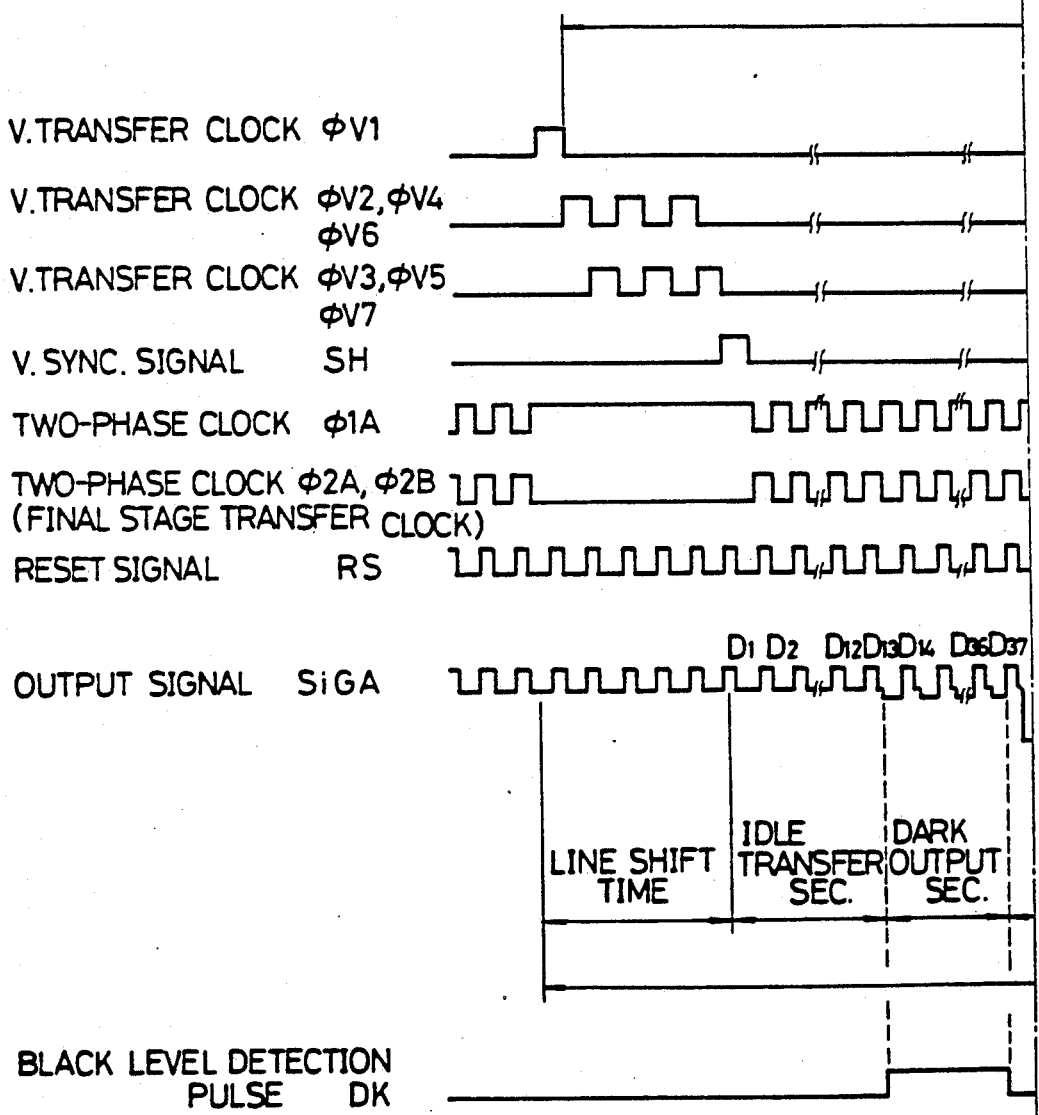

| DIGITAL INPUT N | ANALOG OUTPUT |
|---|---|
| MSB          LSB<br>1 1 1 1 1 1 1 1 | $+V_{IN}\left(\frac{127}{128}\right)$ |
| 1 0 0 0 0 0 0 1 | $+V_{IN}\left(\frac{1}{128}\right)$ |
| 1 0 0 0 0 0 0 0 | 0 |
| 0 1 1 1 1 1 1 1 | $-V_{IN}\left(\frac{1}{128}\right)$ |
| 0 0 0 0 0 0 0 1 | $-V_{IN}\left(\frac{127}{128}\right)$ |
| 0 0 0 0 0 0 0 0 | $-V_{IN}\left(\frac{128}{128}\right)$ |

| DIGITAL INPUT N | ANALOG OUTPUT |
|---|---|
| MSB          LSB<br>1 1 1 1 1 1 1 1 | $+\frac{R_3}{2R}\left(\frac{127}{128}\right)V_{IN}$ |
| 1 0 0 0 0 0 0 1 | $+\frac{R_3}{2R}\left(\frac{1}{128}\right)V_{IN}$ |
| 1 0 0 0 0 0 0 0 | 0 |
| 0 1 1 1 1 1 1 1 | $-\frac{R_3}{2R}\left(\frac{1}{128}\right)V_{IN}$ |
| 0 0 0 0 0 0 0 1 | $-\frac{R_3}{2R}\left(\frac{127}{128}\right)V_{IN}$ |
| 0 0 0 0 0 0 0 0 | $-\frac{R_3}{2R}\left(\frac{128}{128}\right)V_{IN}$ |

COLOR IMAGE READING APPARATUS HAVING COMMON CIRCUITRY FOR THE COLOR COMPONENT SIGNALS

This application is a continuation of application Ser. No. 07/400,109 filed Aug. 29, 1989, U.S. Pat. No. 5,038,201 now abandoned.

BACKGROUND OF THE INVENTION

1. Field of the Invention

The present invention relates to a color image reading apparatus for reading a color image by using an image sensor.

2. Related Background Art

Hitherto, as an image sensor which is used to read out an image at a high speed, there has been known a type in which a stripe-shaped filter is provided for an image sensor of one line and color separation signals are time sharingly and dot sequentially read out.

The spectral sensitivity characteristic in a low wavelength range is worse than that in a high wavelength range due to the spectral sensitivity characteristic of the color filter which is used to obtain the color separation signals and the spectral sensitivity characteristic of the image sensor itself.

Therefore, an output signal of the image sensor when a reference image of a standard white plate or the like is read does not become an analog video signal which is dot sequentially color balanced. Therefore, to assure a sufficient dynamic range (S/N ratio) of the color separation signals, in an analog video signal processing circuit, the levels of the color separation signals need to be matched. For this purpose, hitherto, in consideration of easiness of circuit construction and stabilization of sampling points when executing A/D conversion, the dot sequential color signals are respectively separated by a sample and hold circuit (hereinafter, referred to as an S/H circuit) and transformed to simultaneous color signals and subjected to signal processes such as amplification and the like. The levels of the color separation signals when the standard white plate was read are matched, thereby adjusting the color balance.

For instance, a color image signal obtained by reading a color original is separated into three color signals of R (red), G (green), and B (blue) by an S/H (sample and hold) circuit as shown in FIG. 1. Therefore, in the construction in which a color original is divided into five parts in the main scanning direction and is read out by a line sensor of five chips, the construction after the color image signals were sampled and held becomes fifteen (=3×5) analog signal processing systems. FIG. 1 shows a processing block diagram in which an input color image signal of one channel is sampled and held and amplified in consideration of the white level and black level adjustments and, thereafter, it is returned to the color image signal of one system and is then input to an A/D converter, so that multiplexed digital data OLATCH OUT is obtained. FIG. 2 shows a timing chart of the operation of the circuit in FIG. 1.

As shown in the circuit of FIG. 1, each color separating circuit system has a DC level adjusting circuit in addition to the color balance adjusting circuit. The DC level of a black level signal which was read by the image sensor is shifted, thereby matching the levels among the channels of the image sensor constructed by a plurality of chips and coupling the channels.

However, in the construction shown in FIG. 1, since the dot sequential color signal is separated into simultaneous color signals by the S/H circuit, after the S/H circuit, a number of signal processing circuit systems equal to the number of color separation signals are needed. For instance, in the case of reading an original of, for instance, the A4 size whose width in the longitudinal direction is set to 297 mm, an image sensor of the silicon crystalline type is suitable to read at a high speed. However, in the case of the silicon crystalline type, it is difficult to form a long image sensor of such a type in one chip because of a limitation in manufacturing. Therefore, a plurality of silicon crystalline chips are physically properly arranged to thereby form one line sensor. In this case, there is a drawback such that after the S/H circuit, it is necessary to use signal processing circuit systems of the same type and of the number which is equal to a value in which the number of color separation signals is multiplied with the number of chips constructing the image sensor, so that the circuit construction is extremely large.

SUMMARY OF THE INVENTION

The present invention is made in consideration of the conventional problems and it is an object of the invention to provide a color image reading apparatus in which an analog color signal can be processed at a high speed using a simple circuit construction.

Another object of the invention is to provide a color image reading apparatus in which an amplitude of an analog color signal which is dot sequentially output can be corrected using a simple circuit construction.

Still another object of the invention is to provide a color image reading apparatus in which the black level and white level of an analog color signal which is dot sequentially output can be efficiently corrected using a simple circuit construction.

The above and other objects and features of the present invention will become apparent from the following detailed description and the appended claims with reference to the accompanying drawings.

BRIEF DESCRIPTION OF THE DRAWINGS

FIG. 4(a) is an arrangement diagram of a color CCD sensor;

FIG. 4(b) is a timing chart of a signal of each section in FIG. 4(a);

FIG. 5(b) is a timing chart of a signal in each section in FIG. 5(a);

DETAILED DESCRIPTION OF PREFERRED EMBODIMENTS

A color image reading apparatus according to the present invention will now be described in detail hereinbelow with reference to the drawings.

Figure 3:
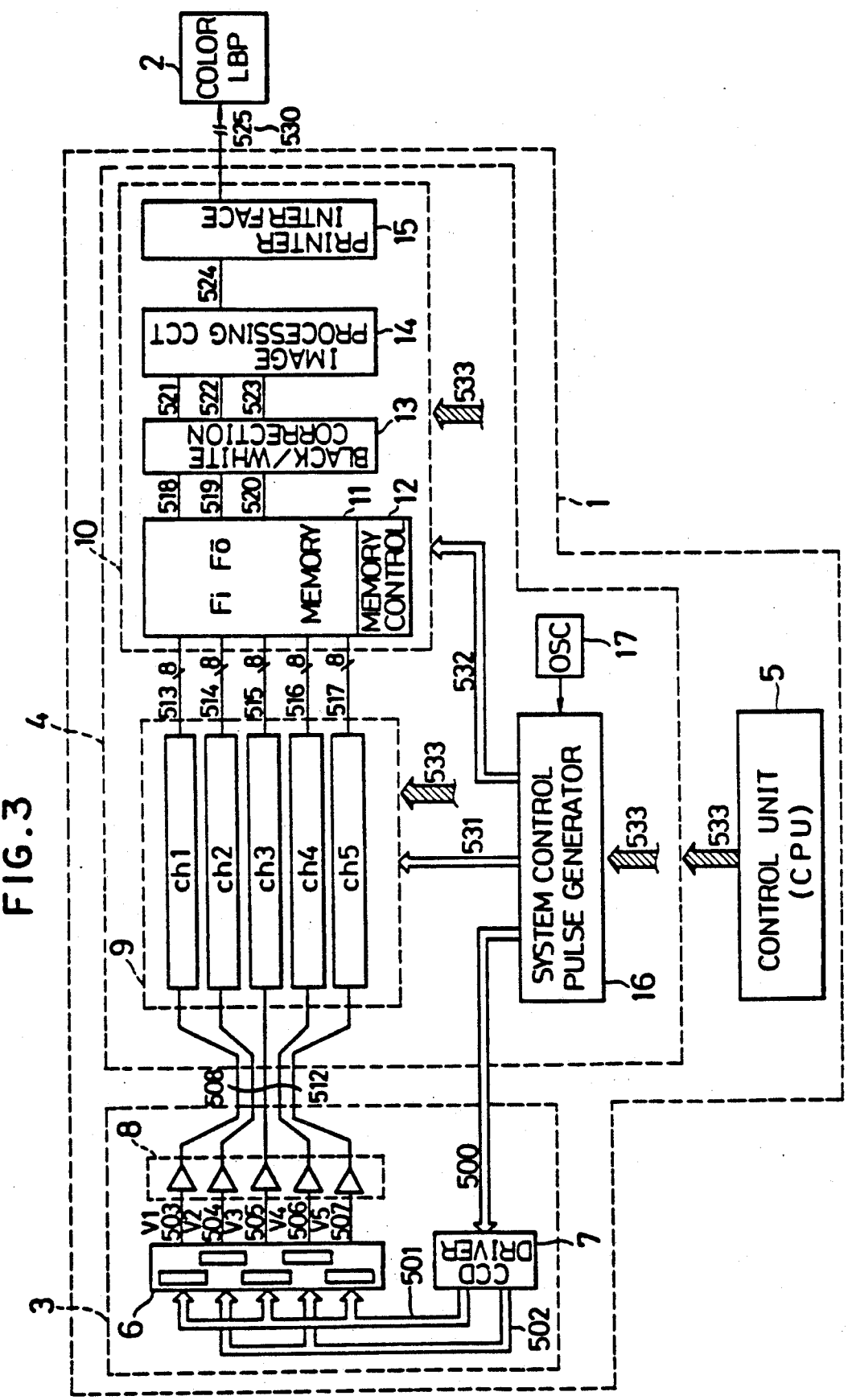
FIG. 3 is a block diagram showing a video signal processing unit of a reader section in a digital color copying machine according to an embodiment of the present invention.

FIG. 3 shows an example of a signal processing circuit of the color image reading apparatus. An original is first exposed by an exposure lamp and light reflected therefrom is color separated and read for every image by a color reading sensor 6 in an original scanning unit 3, and the color component signals are amplified to predetermined levels by an amplifying circuit (preamplifier) 8. Reference numeral 7 indicates a CCD driver to supply a pulse signal to drive the color reading sensor. A necessary pulse source is provided by a system control pulse generator 6. FIG. 4 shows the color reading sensor and drive pulses. FIG. 4(a) shows the color reading sensor which is used in the embodiment. To divide the main scanning direction into five parts and to read them, the color reading sensor has a one-dimensional sensor of five chips. In each of the chips 18 to 22, a length of 62.5 μm (1/16 mm) is set to one pixel and one chip corresponds to 976 pixels. That is, one pixel is divided into three parts of G, B and R in the main scanning direction as shown in the diagram, so that each chip totally has 3072 (=1024×3) effective pixels. On the other hand, the chips 18 to 22 are formed on the same ceramics substrate. The first, third and fifth chips (18, 20, 22) are arranged on a same line LA, while the second and fourth chips (19, 21) are arranged on a line LB which is away from the line LA by four lines (the distance of 250 μm=62.5 μm×4). When an original is read, it is scanned in the direction of an arrow AL. Among the five CCD chips, the first, third and fifth chips are respectively independently driven synchronously with a group of drive pulses ODRV 501 and the second and fourth chips are respectively independently driven synchronously with a group of drive pulses EDRV 502. As shown in FIG. 4(b), Oφ1A, Oφ2A and ORS included in the ODRV 501 denote charge transfer clocks in each sensor. Eφ1A, Eφ2A and ERS included in the EDRV 502 denote charge reset pulses in each sensor. Those charge transfer clocks and charge reset pulses are substantially synchronously formed so as not to cause a jitter due to the mutual interference and noise limitation between the first, third and fifth chips and the second and fourth chips. For this purpose, those clocks and pulses are produced by one reference oscillating source (OSC) 17 (FIG. 3).

Figure 5A:
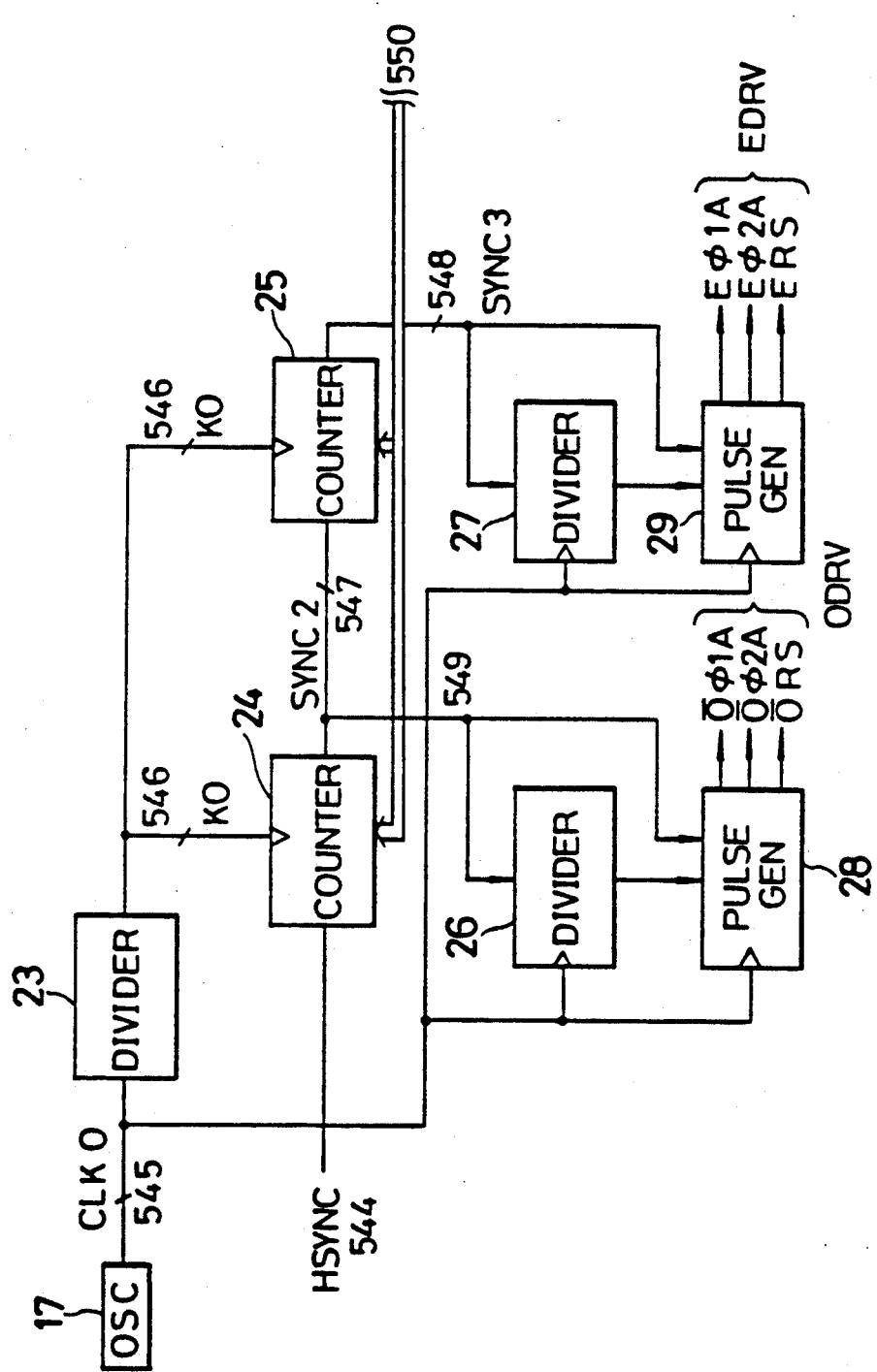
FIG. 5(a) is a diagram showing a CCD drive signal producing circuit (included in a system control pulse generator 16)

FIG. 5(a) is a block diagram of a circuit to form the ODRV 501 and EDRV 502. FIG. 5(b) shows a timing chart. The circuit of FIG. 5(a) is included in the system control pulse generator 16 in FIG. 1. A clock Kφ 546 is formed by frequency dividing an original clock CLKφ which is generated from the single OSC 17 by a frequency divider 23. The clock Kφ 546 is used to form reference signals SYNC$_2$ and SYNC$_3$ to determine the generation timings of the ODRV and EDRV. The output timings of SYNC$_2$ and SYNC$_3$ are determined in accordance with set values of presettable counters 24 and 25 which are set by a signal line 550 connected to a CPU bus. The SYNC$_2$ and SYNC$_3$ signals initialize frequency dividers 26 and 27 and drive pulse generators 28 and 29. That is, each of the drive pulses uses a signal HSYNC 544 which is input to the block as a reference and is formed by the CLKφ which are all output from the OSC 17 as one oscillating source and by the frequency divided clocks which are all synchronously generated. Therefore, the pulse groups of the ODRV 501 and EDRV 502 are obtained as the synchronized signals having no jitter, so that the fluctuations of the signals due to the interferences among the sensors can be prevented.

The sensor drive pulses ODRV 501 which were mutually synchronously derived are supplied to the first, third, and fifth sensor chips and the pulses EDRV 502 which were mutually synchronously obtained are supplied to the second and fourth sensor chips. Video signals V$_1$ to V$_5$ are independently output from the sensor chips 18 to 22 synchronously with the drive pulses. The video signals V$_1$ to V$_5$ are amplified to predetermined voltage values by the amplifying circuit (preamplifier) 8 which is independently provided for every channel as shown in FIG. 3. Through coaxial cables 508 to 512, the signals V$_1$, V$_3$. and V$_5$ are output at a timing of a pulse OOS 538 in FIG. 4(b) and the signals V$_2$ and V$_4$ are output at a timing of a pulse EOS 543 in FIG. 4(b) and the signals V$_1$ to V$_5$ are input to a video processing unit 4.

An explanation will now be given with respect to an analog signal processing circuit 9 in which by using a dot sequential amplitude control circuit, it is sufficient to use one signal processing circuit system per channel.

The analog color image signals V$_1$ to V$_5$ which were read out by the five-chip color sensor of the equal magnification type are input to the analog signal processing circuit 9 in FIG. 3 every channel, respectively. Since the signal processing circuit corresponding to each channel is the same circuit, the circuit of the channel 1 (ch1) will be described with reference to a processing block diagram of FIG. 7 together with a timing chart of FIG. 8.

Figure 6B:
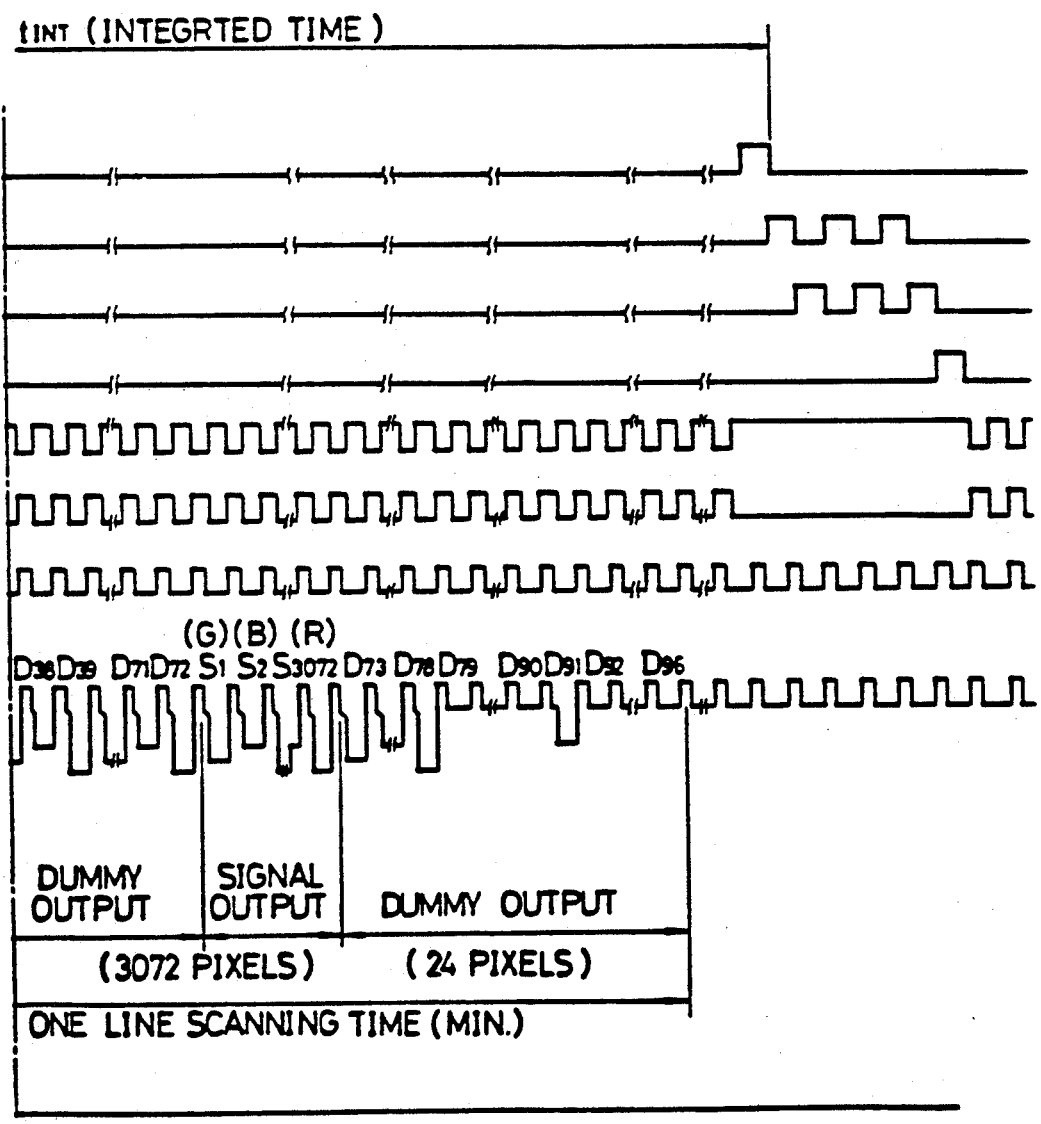
FIG. 6, consisting of FIGS. 6a and 6b, is a timing chart for driving a CCD.

As shown by SiGA in FIG. 6, the analog color image signals are input to a buffer 30 in the order of G→B→R and are the composite signals which are constructed by a total of 3156 pixels comprising: the 3072 effective pixels; 12 pixels in the idle transfer section which is not connected to a photodiode of the color sensor, 24 pixels in the dark output section (optical black) formed by light shielding a region on the photodiode by using aluminum (Al), and 36 dummy pixels, in which these (12+24+36) pixels are provided before the effective pixels; and 24 dummy pixels after the effective pixels.

The analog color image signal SiGA is input to the buffer 30 and impedance converted. Next, an output signal of the buffer 30 is supplied to a sample and hold (S/H) circuit 31, by which the reset section in the composite signals is eliminated in accordance with S/H pulses, so that an S/H output signal (S/H OUT in (FIG. 8) from which a waveform distortion in the case of driving at a high speed was eliminated) is obtained. Since the unnecessary components at the frequency of the sampling pulses are included in the sampled and held dot sequential color signal, the color signal is then input to a low pass filter (LPF) 32 to eliminate the unnecessary components. The dot sequential color signal from which the unnecessary sampling frequency components were eliminated is input to an amplifier 33 and amplified to a specified signal output level and, at the same time, it is clamped to the zero level by a feedback clamping circuit in order to eliminate the DC level fluctuation of the analog color signal whose DC level fluctuates in an AC manner and to fix the DC level of the image signal to the optimum operating point of the amplifier 33.

The feedback clamping circuit comprises an S/H circuit 34a and a comparison amplifier 34b. The output level of the dark output section (optical black) of the analog color signal which is output from the amplifier 33 is detected by the S/H circuit 34a and compared with the GND level which is input to a minus input terminal of the comparison amplifier 34b. The difference is fed back to the amplifier 33, so that the dark output section of the output of the amplifier 33 is always fixed to the GND level. A DK signal indicates an interval of the dark output section of the analog color signal. By supplying the DK signal to the S/H circuit 34a, the DC level of the dark output section of the analog color signal is detected once for one horizontal scan period (1H). On the other hand the feedback clamping circuit also has an object to eliminate the input offset when the amplitudes of R, G, and B are switched by a dot sequential amplitude control circuit at the next stage.

The signal obtained by clamping the dark output section of the analog color signal to the zero level is then input to the dot sequential amplitude control circuit, by which gains are dot sequentially adjusted every R, G, and B by the CPU control. That is, reference numerals 38a to 38c denote D/A converters, into which data is set through a data bus 533 of the CPU. A D/A output $V_{out}$ becomes as follows.

$$V_{out} = -V_{refl}/N\_(0<N<1)$$

N is a binary fraction value of an input digital code.

Reference numerals 37a to 37c denote voltage controlled resistors comprising dual gate FETs or the like. Resistance values of the voltage controlled resistors 37a to 37c change depending on D/A output voltages of the D/A converters 38a to 38c, respectively. Reference numerals 36a to 36c denote analog switches comprising FETs or the like. When gate signals RSEL, GSEL, and BSEL are set to the "H" level, the analog switches 36a to 36c are turned on and are set to a low impedance. When the gate signals are set to the "L" level, they are turned off and are set to a high impedance. Initial data have been preset into the D/A converters 38a to 38c. Resistance values ($R_{VCRa}$ to $R_{VCRc}$) of the voltage controlled resistors 37a to 37c are set to predetermined values due to the D/A outputs upon data initialization, respectively. When only the gate signal RSEL is at the "H" level and the other gate signals GSEL and BSEL are at the "L" level, the gain of the R signal in the dot sequential color signal becomes $$R_{VR}=1+Rf/(R_{ON}+R_{VCRa})$$

Figure 9:
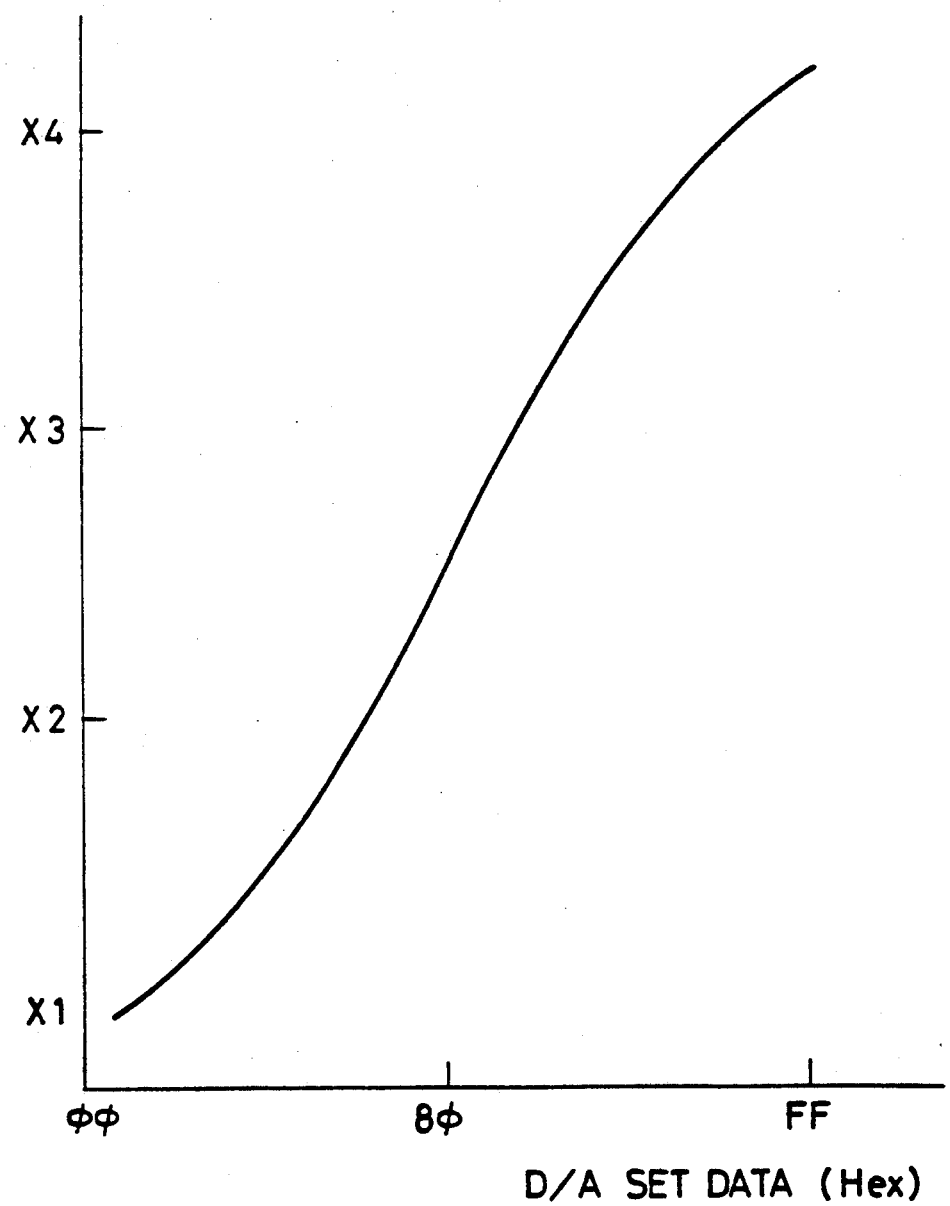
FIG. 9 is a characteristic diagram of a voltage controlled type amplifying circuit.

Rf denotes a feedback resistor of an amplifier 35 and $R_{ON}$ indicates a resistance value when the analog switches 36a to 36c are turned on. FIG. 9 shows the relation between the D/A set data and the gain. The same shall also apply to the other color signals G and B.

When the gate signals GSEL and BSEL are at the "H" level, the gains become $$R_{VG}=1+Rf/(R_{ON}+R_{VCRb})$$

$$R_{VB}=1+Rf/(R_{ON}+R_{VCRc})$$

Figure 8A:
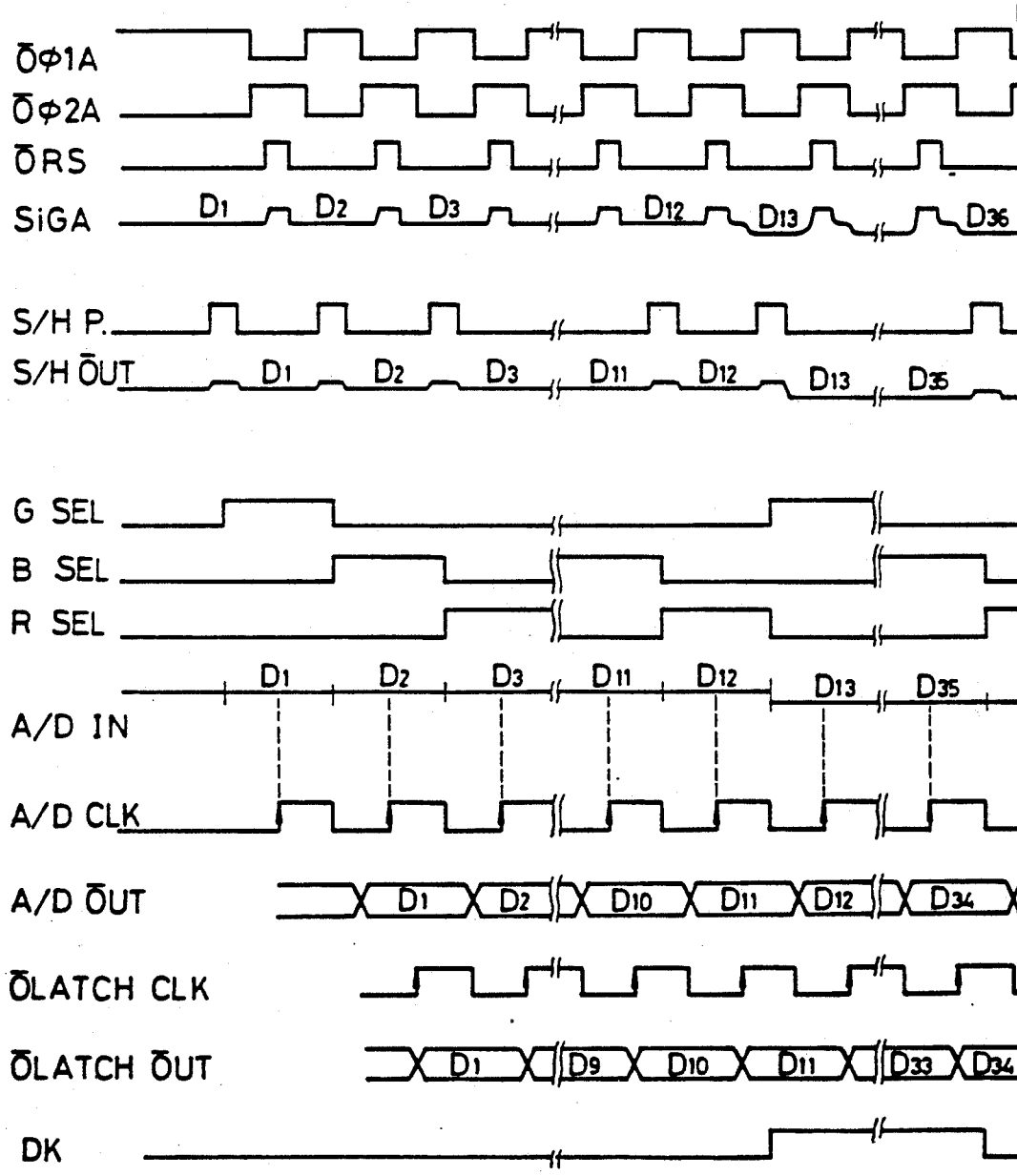
FIG. 8, consisting of FIGS. 8a and 8b, is a timing chart of a signal of each section in FIG. 7.
Figure 8B:
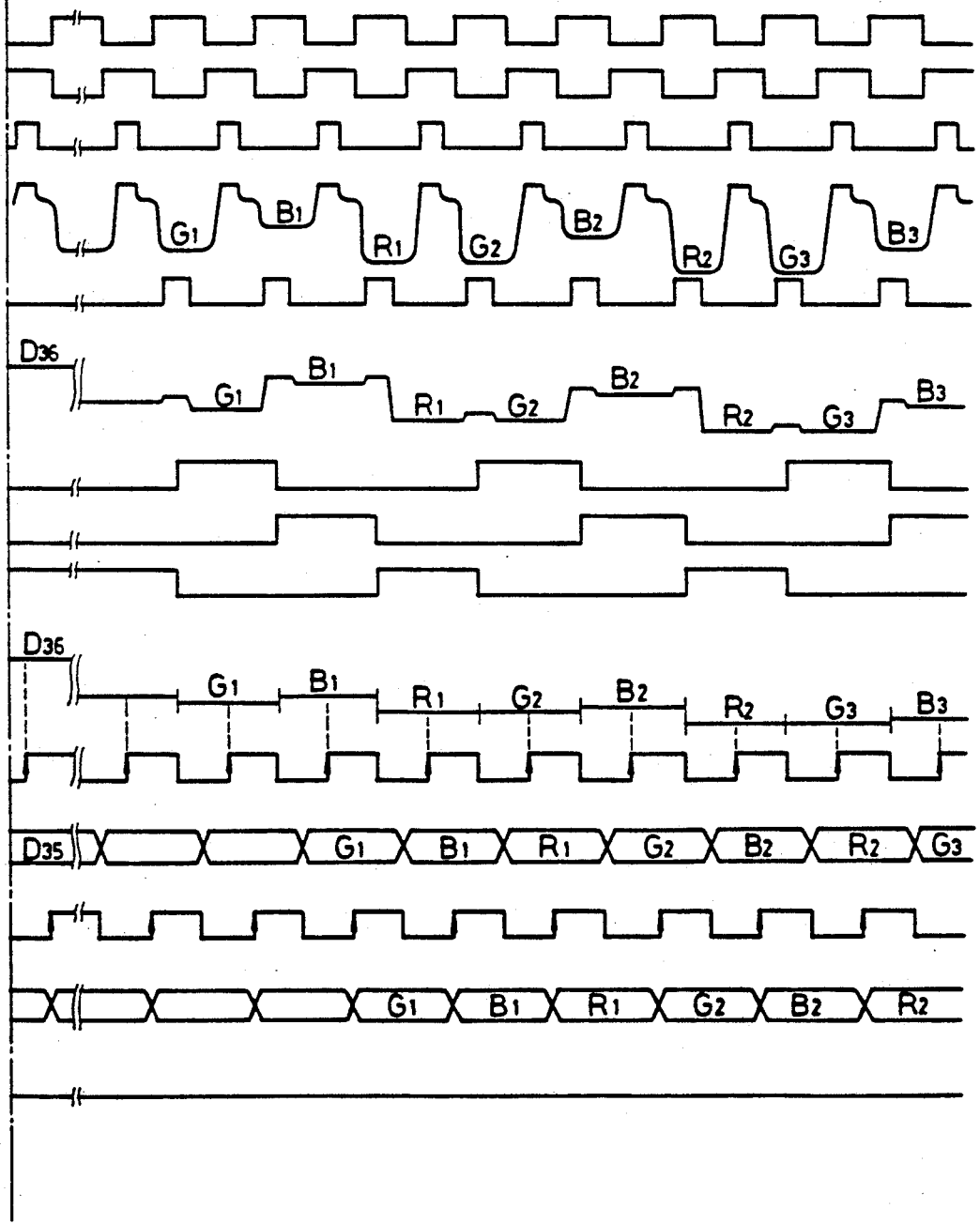

The RSEL, GSEL, and BSEL correspond to the intervals of the R, G, and B signals in the dot sequential color signal (FIG. 8). The gains can be dot sequentially switched by the gate signals. The data of the D/A converters 38a to 38c are set by the data bus 533 of the CPU in a manner such that the A/D conversion output data (R, G, and B), when the original scanning unit 3 reads a uniform color plate, are set to predetermined values. The levels of the R, G, and B signals of the dot sequential color signals are amplified by using the independent gains, thereby obtaining a color balance.

The analog color signal whose level was dot sequentially controlled is then input to an amplifier 39 and amplified until an input dynamic range of an A/D converter 43 and, at the same time, the DC level is controlled by a feedback clamping circuit 41 and a multiplier 42.

A feedback clamping system comprising the multiplier 42 and feedback clamping circuit 41 will now be described. The feedback clamping system has almost the same construction as the feedback clamping circuit 34 at the front stage. The multiplier 42 which is controlled by the CPU is connected for providing a reference voltage of the feedback clamping circuit comprising an S/H circuit 41a, and a comparison amplifier 41b. In the channel junction correction, which will be explained hereinlater, in order to shift the level of the black level image signal which was read, the reference voltage is varied by the multiplier 42 by the level which is determined by the digital data which was set in an internal latch circuit through the data bus 533 of the CPU. The analog color signal which was amplified by the amplifier 39 and a buffer 40 is clamped to the refereencee voltage level.

Figures 11A, 11B:
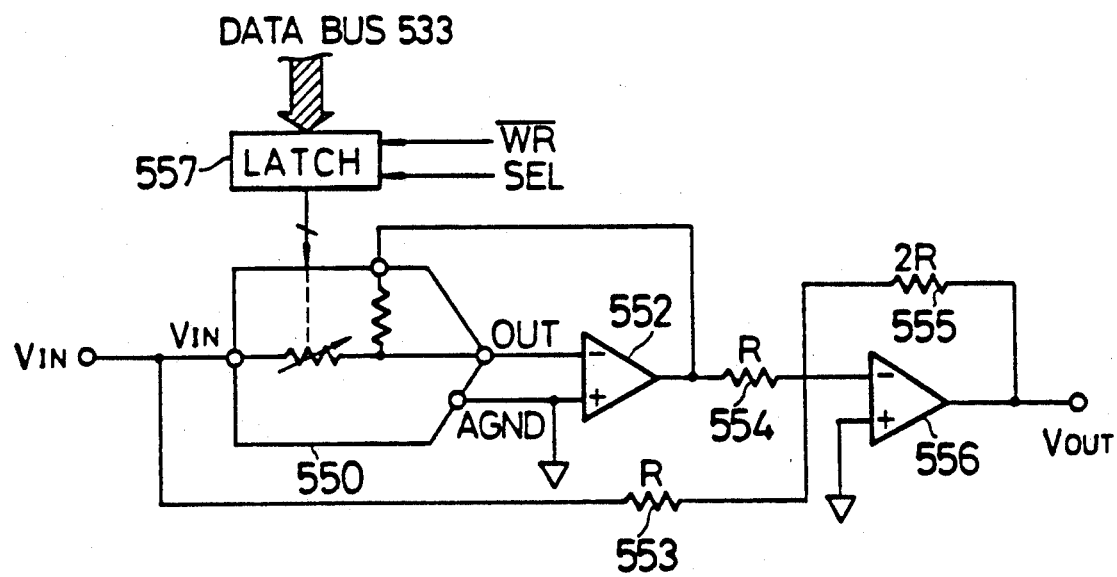
FIG. 11(a) is a circuit diagram of a multiplier 42 in FIG. 7.
FIG. 11(b) is a diagram showing a code table.

As shown in FIG. 11(a), the multiplier 42 is a full four-quadrant mode multiplier comprising: a multiplying D/A converter 550; operational amplifiers 552 and 556; resistors 553 and 554 each having a resistance value R; and a resistor 555 having a resistance value 2R. The multiplier 42 outputs a bipolar voltage as shown in FIG. 11(b) in accordance with the 8-bit digital data which was set from the CPU. The buffer 40 is an input buffer of the A/D converter 43 and is constructed as a high-speed buffer of a low output impedance in a manner such that its output impedance is set to a reference resistance value or less of a comparator in the A/D converter which assures the linearity accuracy of the A/D conversion.

The dot sequential color signal which was amplified and DC clamped to a predetermined white level and a predetermined black level is input to the A/D converter 43 and becomes digital data A/D OUT and is input to a latch circuit 44 for matching of the timing with that of the digital signal processing circuit and for certain digital data transmission.

The latch output data which was latched by a pulse OLATCH CLK is latched by a latch clock having the polarity opposite to that of the OLATCH CLK by a next digital signal processing circuit 10, so that the digital data can be received at a certain timing. The same shall also apply to the analog signal processing circuits of the other channels 2 to 5.

In FIG. 3, dot sequential color signals 513 to 517 of the respective channels which were digitally converted are input to the digital signal processing circuit 10 and images of the channels are connected by a FIFO memory 11, so that the dot sequential color signals of the channels become the parallel signals of three colors of R, G, and B (518 to 520).

The R, G, and B digital color signals are input to a black/white correction circuit 13. The black correction circuit will be first described. When an amount of light which enters the sensor is very small, the black level outputs of the channels 1 to 5 have a large variation among the chips and among the pixels. If the black level outputs are directly output and an image is output, line noises or uneven images occur in the data section of the image. Therefore, it is necessary to correct an output fluctuation of the black portion. Prior to executing the copying operation, the original scanning unit 3 is moved to the position of a black plate having a uniform concentration arranged in a non-image region in the front edge portion of an original base plate, a halogen lamp is lit on, and a black level image signal is input to the circuit. The data of one line in the image data is stored in a black level memory and is set to a black reference value (a black reference value fetching mode).

For instance, if there is provided a width in the longitudinal direction of the A4 size in the main scanning direction, in the case of the resolution of 16 pel/mm, the number of pixels is set to $16 \times 297$ mm = 4752 pixels/color. To cover such a length, if five CCD chips each having a length of 61 mm are arranged to form one line, the number i of data of the black level data DK(i) can be set to a value within a range from 1 to 4880 in correspondence to $16 \times 61$ mm $\times 5 = 4880$ pixels/color.

When an image is read, for the black level data DK(i), for instance, in the case of a blue signal, a black correction output is derived as $B_{in}(i) - DK(i) = B_{out}(i)$ (black correcting mode). A green signal $G_{in}$ and a red signal $R_{in}$ are also similarly controlled and black correction outputs $G_{out}$ and $R_{out}$ are obtained.

The white level correction (shading correction) circuit will now be described. In the white level correction, sensitivity variations of the illuminating system, optical system, and sensors are corrected on the basis of the white color data in the case where the original scanning unit 3 was moved to the position of a uniform white plate and the original was illuminated. Although a fundamental circuit construction of the white level correction circuit is substantially the same as that of the black correction circuit, there is a difference between them with respect to a point that the black correction is executed by using a subtractor, while the white correction is executed by using a multiplier. First, upon white correction, when the original scanning unit 3 is located at the position (home position) of the uniform white plate, that is, prior to executing the copying or reading operation, the exposure lamp is lit and the data of one line in the image data of the uniform white level is stored into a white level memory.

For instance, if there is provided a width in the longitudinal direction of the A4 size in the main scanning direction, in the case of the resolution of 16 pel/mm, the number of pixels is set to $16 \times 297$ mm = 4752 pixels. If the image data of one chip of the CCD is constructed by 976 pixels (16 pel/mm $\times$ 61 mm), the total number of pixels of one line sensor is set to $976 \times 5 = 4880$ pixels.

That is, the capacity of the white level memory has at least 4880 bytes. Assuming that the white plate data of the ith pixel is set to W(i), i has a value within a range from 1 to 4880. On the other hand, for the read value $D_{in}(i)$ of the ordinary image of the ith pixel with respect to W(i), the image data after correction becomes $$D_{out}(i) = D_{in}(i) \times FF_H / W(i)$$

The white correction is executed with respect to each color of green (G), blue (B), and red (R).

Image signals (521 to 523) of three colors which were subjected to the black correction and white correction are input to an image processing circuit 14 and are image processed by a logarithmic converting circuit, a color correction circuit, black adding circuit, and an under color removing (UCR) circuit and the image processed signal is output (524 in FIG. 3). The logarithmic converting circuit converts the luminance data into the concentration data. The color correction circuit (input masking and output masking) corrects the spectral characteristics of the color separation filters of the CCD sensor and corrects the absorbing characteristics of the unnecessary components of the color toners (Y, M, C) which are copy transferred to a transfer paper in a color printer 2. The black adding circuit calculates the Min($Y_i$, $M_i$, $C_i$) (the minimum value among $Y_i$, $M_i$, and $C_i$) from the color component image data $Y_i$, $M_i$, and $C_i$ and, thereafter, adds the black toner by using the calculated $M_i n(Y_i, M_i, C_i)$ as a black. The UCR circuit reduces addition amounts of the color toner materials in accordance with the black component added.

The image signals of three colors are then input to a printer interface 15. Interface signals comprise, a digital video signal; a sync signal (ITOP) in the image feeding direction (sub scanning direction); a sync signal (BD) in the raster scanning direction (main scanning direction) which is generated once every raster scan; a sync clock (VCLK) to transmit the digital video signal to the color printer 2; a sync signal (HSYNC) which is formed synchronously with the NCLK without a jitter on the basis of the BD signal; and a signal (SRCOM) for executing half duplex bidirectional serial communication. The image data and commands are sent from the reader unit to the printer unit via those signal lines. State information of the printer unit, for instance, information with respect to paper jam, absence of paper, waiting mode, and the like is mutually transmitted and received between the reader unit and the printer unit.

Figure 10:
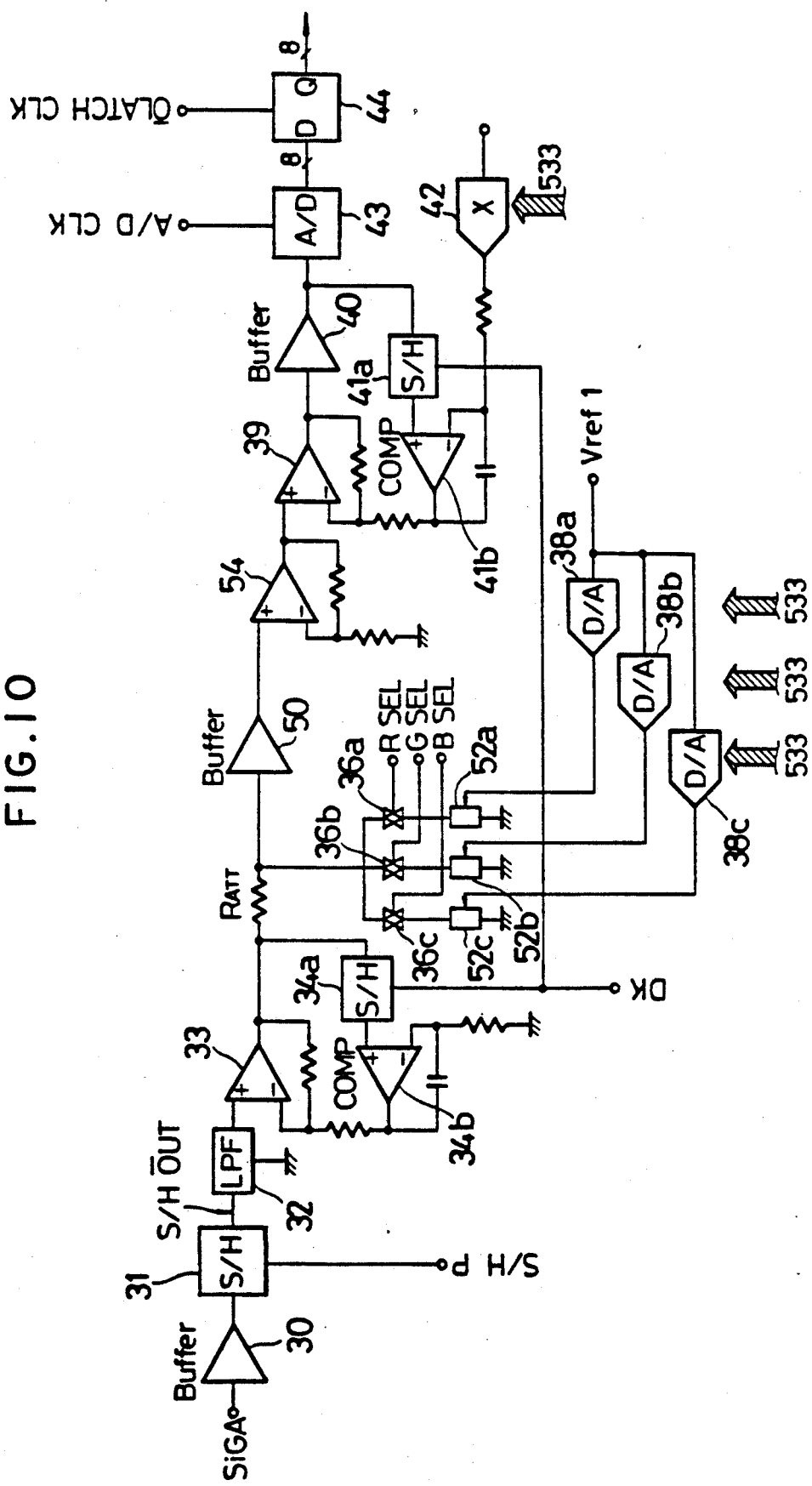
FIG. 10 is a block diagram showing another embodiment of the analog signal processing circuit 9.

In the embodiment, the dot sequential amplitude control circuit has been constructed as a gain switching type amplifying circuit. However, the similar effect can be obtained even if such a control circuit is constructed by an attenuator switching circuit and an amplifying circuit arranged at the post stage. Such a construction is shown in FIG. 10. In FIG. 10, a resistor $R_{ATT}$, voltage controlled resistors 52a to 52c, an amplifier 54, and a buffer 50 are provided in place of the amplifier 35 in FIG. 7 and the other construction is the same as that in FIG. 7. The resistance values $R_{VCRa}$ to $R_{VCRc}$ of the voltage controlled resistors 52a to 52c are controlled by the output voltages of the D/A converters 38a to 38c. For instance, when the analog switch 36a (for the R signal) is turned on, an attenuation factor of the R signal in the dot sequential color signal is $$(R_{ON} + R_{VCRa})/(R_{ATT} + R_{ON}R_{VCRa})$$

Assuming that a gain of the amplifier 54 is set to A, a gain of the R signal at an output of the amplifier 54 is $$R_V = A(R_{ON} + R_{VCRa})/(R_{ATT} + R_{ON} + R_{VCRa})$$

The same shall also apply to the other color signals G and B, so that the amplitude can be dot sequentially controlled.

On the other hand, although the embodiment has been described with respect to an example of the color image forming apparatus using an electrophotograph, various recording methods such as ink jet recording, thermal copy transfer recording, and the like can be also applied without limiting the to an invention electrophotograph. In addition, although the embodiment has been described with regard to an example in which the reading unit and the image forming unit are closely arranged as a copying apparatus, the invention can be also obviously applied to a type in which the reading unit and the image forming unit are separately arranged and the image data is transferred by a communication line.

As described above, by providing the dot sequential amplitude control circuit which can time sequentially control the amplitude of each color separation signal in the state where the dot sequential color signal is output from the image sensor as it is, the amplitudes of the color separation signals can be adjusted by only the S/H circuit and the signal processing circuit at the post stage of one system per chip constructing the image sensor without separating the dot sequential color signal into the simultaneous color signals and adjusting the amplitudes by the respective circruit systems. Therefore, the circuit construction is simplified and the apparatus can be miniaturized.

As described above, according to the invention, the signal processing system is simplified and, particularly, in the image sensor comprising a plurality of image sensor chips, the circuit scale can be fairly reduced.

In the above-described construction of the embodiment, the white level of the analog color image signal has been dot sequentially corrected before the black level is corrected. An example of a construction in which the white level of the analog color image signal is color sequentially corrected after the black level was corrected will now be described.

Figure 7:
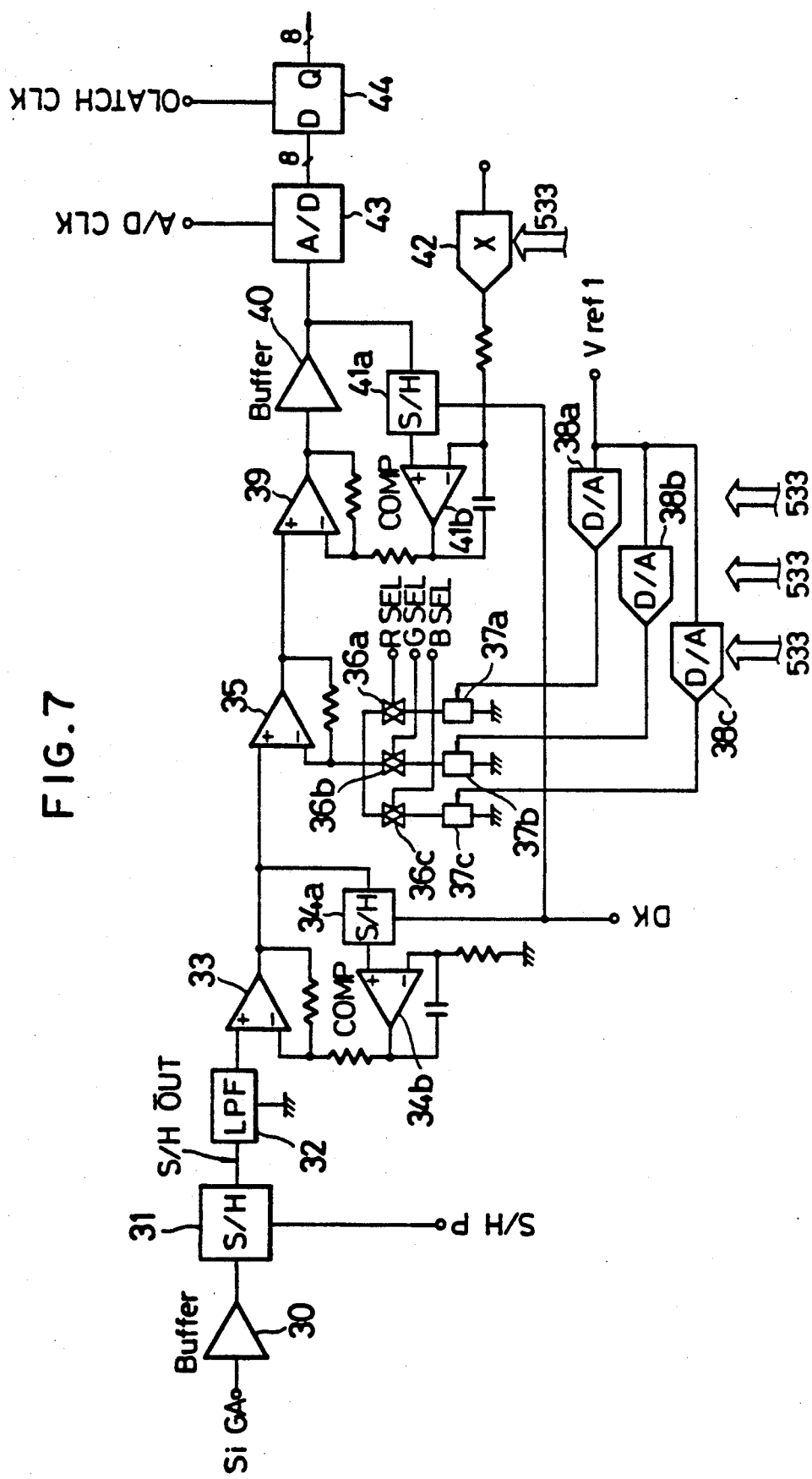
FIG. 7 is a block diagram showing an embodiment of one channel of an analog signal processing circuit 9 in FIG. 1.
Figure 12:
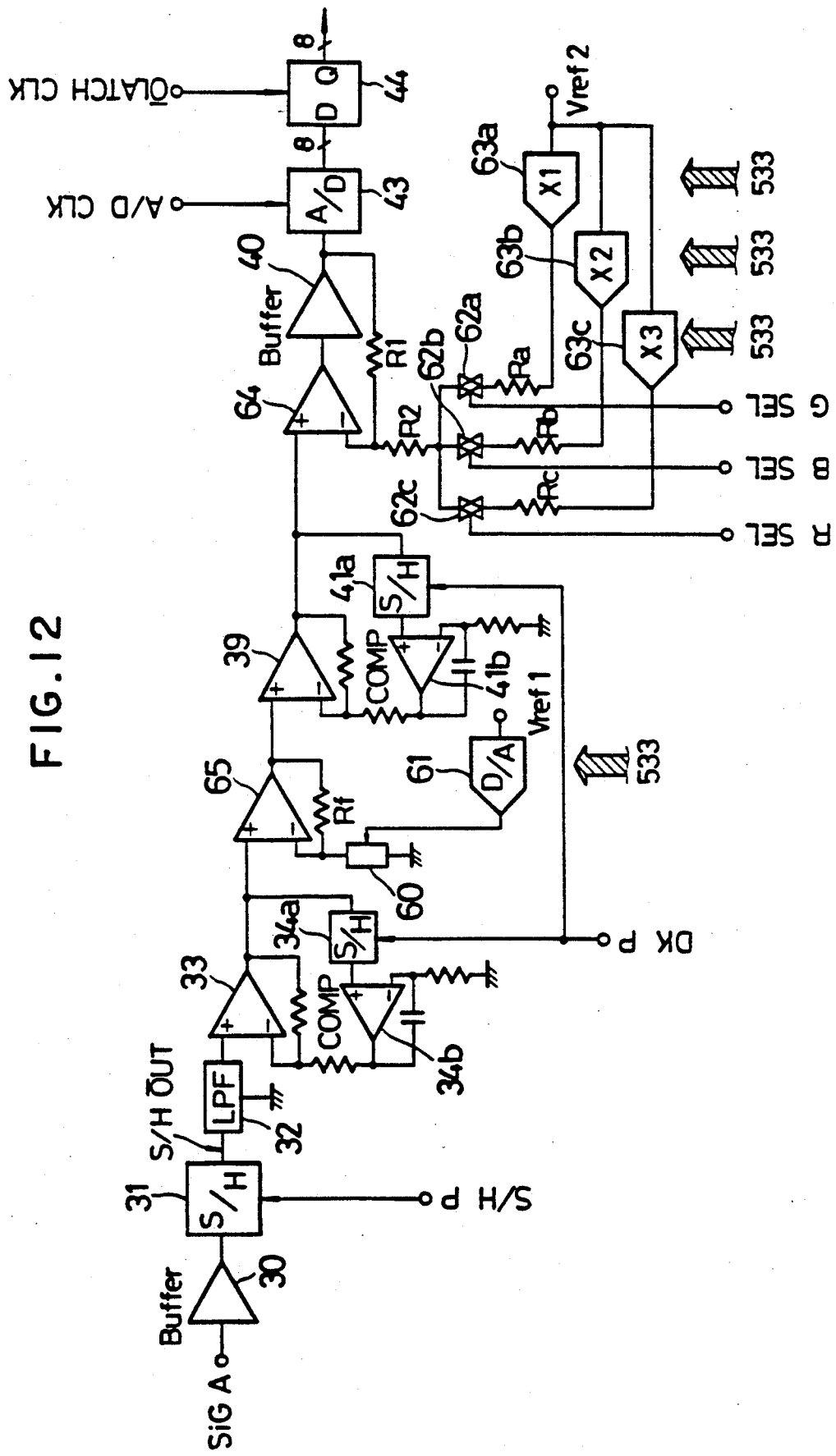
FIGS. 12 and 13 are block diagrams showing another embodiment of the analog signal processing circuit 9.

FIG. 12 is a block diagram showing another construction of the analog signal processing circuit 9. In FIG. 12, the same parts and elements as those shown in FIG. 7 are designated by the same reference numerals. The operation of FIG. 12 will now be explained hereinbelow. As mentioned above, the color image signals obtained by dividing the original into five parts in the main scanning direction and reading the original are respectively input to the analog signal processing circuits 9 corresponding to the channels. Since the signal processing circuits 9 have the same construction, the circuit of the channel 1 (ch1) will be described.

As shown in FIG. 12, the analog color image signal SiGA is input to the buffer 30 and is impedance converted. The reset section in the composite signal is then eliminated by the sample and hold (S/H) circuit 31 in response to an S/H pulse (S/HP), so that an S/H output signal from which only a waveform distortion in the case of driving at a high speed was eliminated is obtained. Since the dot sequential color signal which was sampled and held includes an unnecessary component at the frequency of the sampling pulse, it is input to the low pass filter (LPF) 32 to eliminate the unnecessary component. The dot sequential color signal from which the unnecessary sampling frequency component was eliminated by the LPF 32 is input to the amplifier 33 and amplified until a specified output level and, at the same time, it is clamped to the zero level by the feedback clamping circuit 34 comprising the S/H circuit 34a and comparison amplifier 34b in order to eliminate the DC level fluctuation of the analog color signal whose DC level fluctuates in an AC manner and to fix the DC level of the image signal to the optimum operating point of the amplifier 33. That is, the output level of the dark output section (optical black) in the analog color signal which is output from the amplifier 33 is detected by the S/H circuit 34a and is compared with the GND level which is input to a minus input terminal of the comparison amplifier 34b by the amplifier 34b. The differential signal is fed back to the amplifier 33, so that the dark output section in the output signal of the amplifier 33 is always fixed to the GND level. The DK signal which is input to the S/H circuit 34a indicates the interval of the dark output section in the analog color signal. By supplying the DK signal to the S/H circuit 34a, the DC level of the dark output section in the analog color signal is once detected for one horizontal scan period (1H). The feedback clamping circuit 34 also has the object eliminating the input offset when the amplitude is varied by the amplitude control circuit at the next stage. The signal obtained by clamping the dark output section in the analog color signal to the zero level by the feedback clamping circuit 34 is then input to an amplifier 65 constructing the amplitude control circuit. The gains of the dot sequential color signals are commonly adjusted by the CPU control here.

Reference numeral 61 indicates a D/A converter into which data is set through the data bus 533 of the CPU. An output $V_{out}$ of the D/A converter 61 becomes $$V_{out} = -V_{refl}/N\_(0 < N < 1)$$

N denotes a binary fraction value of the input digital code. Reference numeral 60 indicates a voltage controlled resistor comprising a dual gate FET or the like and its resistance value changes depending on the output voltage of the D/A converter 61. Initial data has been preset into the D/A converter 61. A resistance value $R_{VCR}$) of the voltage controlled resistor 60 is set to a predetermined value in dependence on the D/A output at that time. A gain of the amplifier 35 at this time is $$AV = 1 + Rf/R_{VCR}$$

where RF denotes a feedback resistance of the amplifier 65.

There is a relation as shown in FIG. 9 between the data in the D/A converter 61 and the gain of the amplifier 65. Data of the D/A converter 61 is set by the CPU data bus 533 in a manner such that the A/D conversion outputs data (R, G, B) when the original scanning unit 3 reads a uniform white plate set to predetermined values. The levels of the R, G, and B signals of the dot sequential color signals are matched by together using the amplitude varying means of the respective color signals in the dot sequential DC level control circuit, which will be explained hereinlater, thereby obtaining a color balance.

The level controlled dot sequential color signal from the amplifier 65 is then input to the amplifier 39 and amplified to a predetermined level and is clamped to the zero level by the feedback clamping circuit 41 comprising the S/H circuit 41a and comparison amplifier 41b. Since the feedback clamping circuit 41 has the same construction as that of the feedback clamping circuit 34 at the front stage, its operation is not described in detail here. However, the feedback clamping circuit 41 is provided to eliminate the output offset which is caused due to the variable change in the gain by the amplitude control circuit due to the D/A converter 61 at the front stage and to fix the dark output section in the analog color signal to the zero level.

Figures 14A, 14B:
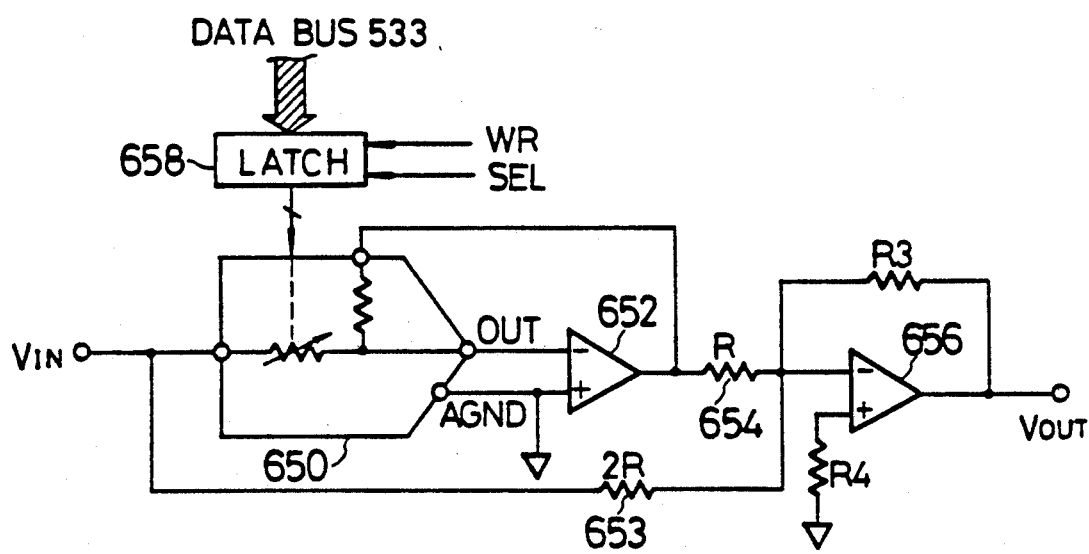
FIG. 14(a) is a circuit diagram of multipliers 63a to 63c in FIG. 12.
FIG. 14(b) is a diagram showing a code table.

The analog color signal which was again clamped to the zero level by the feedback clamping circuit 41 is then input from the amplifier 39 to the dot sequential DC level control circuit having the following construction. The levels of the R, G, and B signals in the dot sequential signal are matched and the DC levels are dot sequentially adjusted every R, G and B by the CPU control. It is an object of such a level adjustment to shift the DC level of the readout black level image signal in a channel junction correction, which will be explained hereinbelow. Reference numeral 62a to 62c denote analog switches comprising FETs or the like. When the gate signals GSEL, BSEL, and RSEL are set to the "H" level, the switches 62a to 62c are turned on and are set to a low impedance. When the gate signals are set to the "L" level, the switches 62a to 62c are turned off and are set to a high impedance. Reference numerals 63a and 63c denote multipliers. As shown in FIG. 14(a), the multipliers 63a to 63c are full four-quadrant mode multipliers comprising, a multiplying D/A converter 650; operational amplifier 652 and 656; a resistor 654 having a resistance value R; a resistor 653 having a resistance value 2 R; and resistors $R_3$ and $R_4$. A bipolar voltage is output as shown in FIG. 11(b) in accordance with 8-bit digital data set from the CPU. In FIG. 12 $R_a$ $R_b$, and $R_c$ denote resistors to vary a gain of an amplifier 64 every G, B, and R in order to obtain a color balance of the dot sequential color signal. When the signal GSEL is at the "H" level, the gain of the amplifier 64 for the G signal becomes $$1+R_1/(R_2+R_{ON}+R_a)=A_G$$

$R_{ON}$ denotes a resistance value when the analog switches 62a to 62c are turned on. The same shall also apply to the other color signals B and R. When the gate signals BSEL and RSEL are at the "H" level, the gains of the amplifier 64 respectively become $$1+R_1/(R_2+R_{ON}+R_b)=A_B$$

$$1+R_1/(R_2+R_{ON}+R_c)=A_R$$

Now, assuming that the color ratio of the dot sequential color signal of the color reading CCD sensor is set such that $G:B:R=k':1:l$, in order to obtain a color balance, the resistance values of the resistors $R_a$, $R_b$, and $R_c$ are selected in a manner such that the gains of the amplifier 64 for the G, B, and R signals are set as follows.

$$A_G:A_B:A_R=1/k:1:1/l$$

Now, since the gains of the amplifier 64 for the G, B, and R signals change, in order to equalize the DC output voltages of the amplifier 64 with respect to the G, B, and R signals for the data values which are set into the multipliers 63a to 63c by the CPU, the value of the resistor $R_3$ shown in FIGS. 14(a) and 14(b) is selected with respect to, for instance, the G signal such that $$R_3=(2R/R_1)\times(R_2+R_{ON}+R_a)$$

from the relation $$(R_3/2R)\times[R_1/(R_2+R_{ON}+R_a)]=1$$

With respect to the other color signals B and R as well, by selecting the value of each $R_3$ such that $$R_3=(2R/R_1)\times(R_2+R_{ON}+R_b)$$

$$R_3=(2R/R_1)\times(R_2+R_{ON}+R_c)$$

the DC output voltages of the amplifier 64 for the G, B, and R signals are equalized with respect to the CPU set data values in the multipliers 63a to 63c. A situation such that the DC levels with respect to G, B, and R differ by changing the gain of the amplifier 64 does not occur. As mentioned above, the color balance of the color signals is obtained by the dot sequential DC level control circuit and the DC level of the dot sequential color signal is time sequentially controlled by the CPU set data.

The buffer 40 is an input buffer of the A/D converter 43 and is constructed as a high-speed buffer of a low output impedance in a manner such that its output impedance is set to a value of a reference resistance value or less of a comparator provided in the A/D converter 43 for assuring the linearity accuracy of the A/D converter 43.

The dot sequential color signal which was amplified and DC clamped to a predetermined white level and a predetermined black level is converted into the digital data A/D OUT by the A/D converter 43 and is then input to the latch circuit 44 to match the timing with that of the digital signal processing circuit and to execute certain digital data transmission.

In the latch circuit 44, the latch output data latched by the latch clock OLATCH CLK is latched by the digital signal processing circuit at the next stage by the latch clock having the polarity opposite to the polarity of the OLATCH CLK, so that it is received at a certain timing. The same shall also apply to the analog signal processing circuits of the channels 2 to 5 in FIG. 1.

As mentioned above, the dot sequential color signals 513 to 517 of the channels which were digitally converted by the analog signal processing circuits 9 are input to the digital signal processing circuit 10. The images of the channels are connected by the FIFO memory 11. The dot sequential color signals of the channels become the parallel signals 518 to 520 of three colors of R, G, and B.

Figure 13:
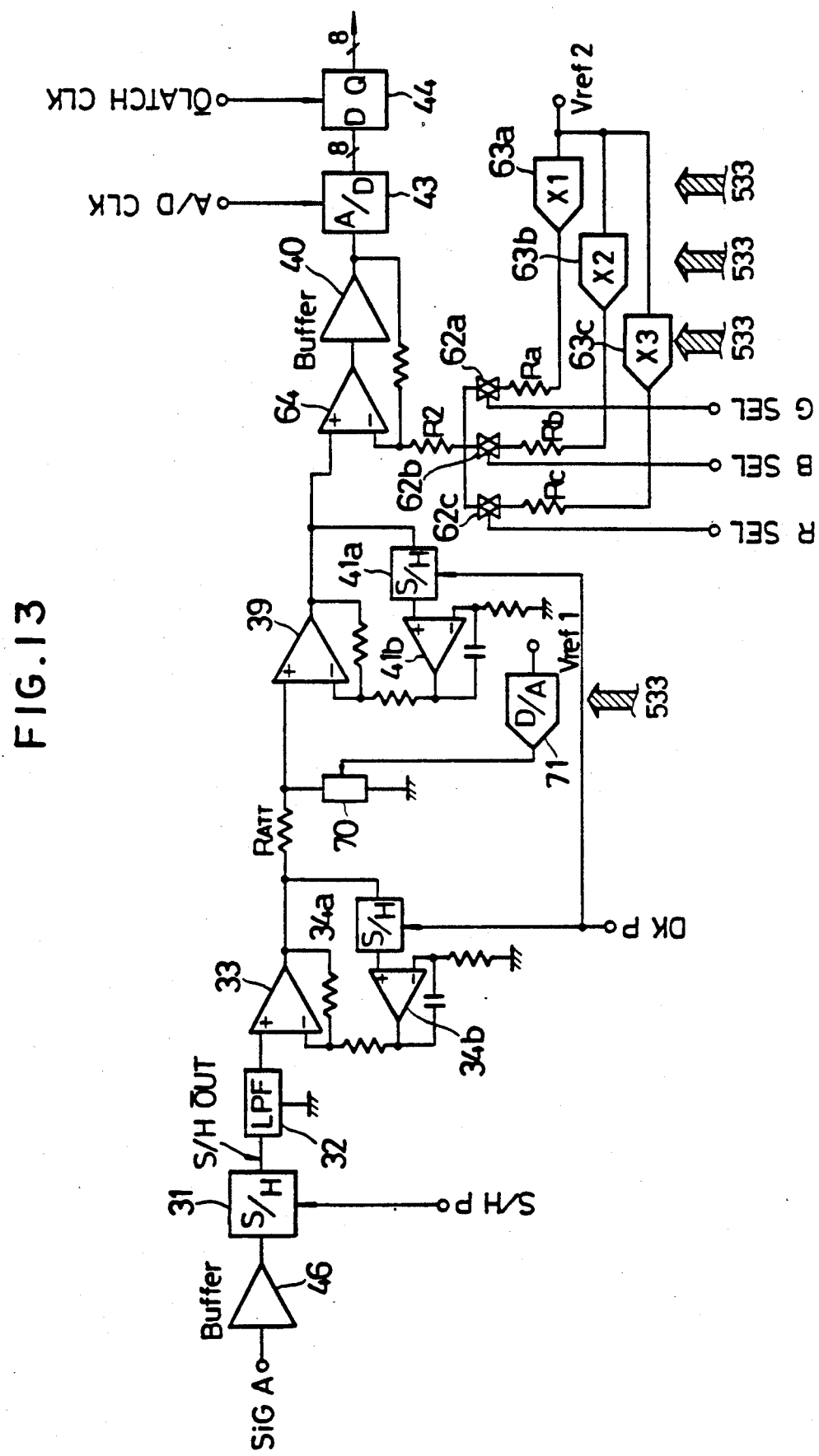

In the embodiment of FIG. 12, the amplitude control circuit has been constructed as a gain variable amplifying circuit. However, similar effects can be also obtained even if the amplitude control circuit is constructed by an attenuator circuit. FIG. 13 shows an example of such a construction. In FIG. 13, a resistor $R_{ATT}$ and a voltage controlled resistor 70 are used in place of the amplifier 65 in FIG. 12 and the other construction is similar to that in FIG. 12.

Although the above embodiment has been described with respect to an example of the color image forming apparatus using an electrophotograph, various recording methods such as ink jet recording, thermal copy transfer recording, and the like can be also utilized without limiting the invention to an electrophotograph. On the other hand, although the embodiment has been described with respect to an example of the copying apparatus in which the reading unit and the image forming unit are closely arranged, the invention can be also obviously applied to a type in which the reading unit and the image forming unit are separately arranged and image data is transferred by a communication line.

As described above, the circuit system for processing the image sensor output signal as an analog signal has been constructed by the amplitude control circuit and dot sequential DC level control circuit. Thus, there is no need for the dot sequential color signal to be separated into simultaneous color signals via the S/H circuit every color and a similar signal processing circuit to be provided for each color. It is sufficient to use one signal processing circuit system per channel of the image sensor chip. Particularly, in the case of an image sensor comprising a plurality of image sensor chips, the circuit scale can be extremely reduced.

On the other hand, by controlling the amplitude of the dot sequential analog video signal which is output from the image sensor in a state where the dot sequential signal is as it is and by controlling the DC level, the amplitude and DC level of each color separation signal can be adjusted by, for instance, only the S/H circuit and subsequent signal processing circuit of one system per chip constructing the image sensor without separating the dot sequential color signal into the simultaneous color signals and adjusting the amplitude and DC level in each circuit system. Therefore, the circuit construction is simplified and the apparatus can be miniaturized.

Although the present invention has been described above with respect to preferred embodiments, the invention is not limited to the foregoing embodiments but many modifications and variations are possible within the spirit and scope of the appended claims of the invention.

What is claimed is:

1. A color image reading apparatus comprising:
    reading means for reading a color image and dot sequentially outputting a plurality of analog color component signals;
    common amplifying means for sequentially amplifying the plurality of analog color component signals which are dot sequentially output from said reading means;
    common converting means for sequentially converting the plurality of analog color component signals, which are amplified by said common amplifying means, into a plurality of digital color component signals;
    separating means for separating the plurality of digital color component signals, which are converted by said common converting means, into digital color component signals of each color; and
    switching means for sequentially switching a gain of said common amplifying means in accordance with a color of the analog color signal to be amplified.

2. An apparatus according to claim 1, further comprising processing means for processing the digital color component signals of each color from said separating means to form a digital color signal usable for reproduction of the color image.

3. An apparatus according to claim 1, wherein said common amplifying means amplifies the plurality of analog color component signals in a manner such that the plurality of analog color component signals with respect to a white image are set to predetermined levels, respectively.

4. A color image reading apparatus comprising:
    reading means for reading a color image and dot sequentially outputting a plurality of analog color component signals;
    common setting means for sequentially setting a black level of the plurality of analog color component signals, which are dot sequentially output from said reading means, to a predetermined value;
    common correcting means for sequentially correcting a white level of the plurality of analog color signals whose black level was set to the predetermined value by said common setting means;
    common converting means for sequentially converting the plurality of analog color component signals, whose white level was corrected by said common correcting means, into a plurality of digital color component signals; and
    switching means for sequentially switching a correction ratio of said common correcting means in accordance with a color of the analog color component signal to be corrected.

5. An apparatus according to claim 4, wherein said common correcting means comprises common amplifying means for amplifying the plurality of analog color component signals, and wherein said switching means switches a gain of said amplifying means.

6. An apparatus according to claim 4, further comprising separating means for separating the plurality of digital color component signals into digital color component signals of each color.

7. An apparatus according to claim 6, further comprising processing means for processing the digital color component signals of each color from said separating means to form a digital color signal usable for reproduction of the color image.

8. An apparatus according to claim 7, further comprising reproduction means for reproducing the color image in accordance with the digital color signal formed by said processing means.

9. An apparatus according to claim 4, wherein said reading means comprises filter mean for separating the color image into color components.

10. An apparatus according to claim 2, further comprising reproduction means for reproducing the color image in accordance with the digital color signal formed by said processing means.

11. An apparatus according to claim 1, wherein said reading means comprises filter means for separating the color image into color components.

* * * * *

UNITED STATES PATENT AND TRADEMARK OFFICE
CERTIFICATE OF CORRECTION

PATENT NO. : 5,185,659  
DATED : February 9, 1993  
INVENTOR(S) : HIROSHI ITAGAKI, ET AL.

Page 1 of 3

Figure 1:
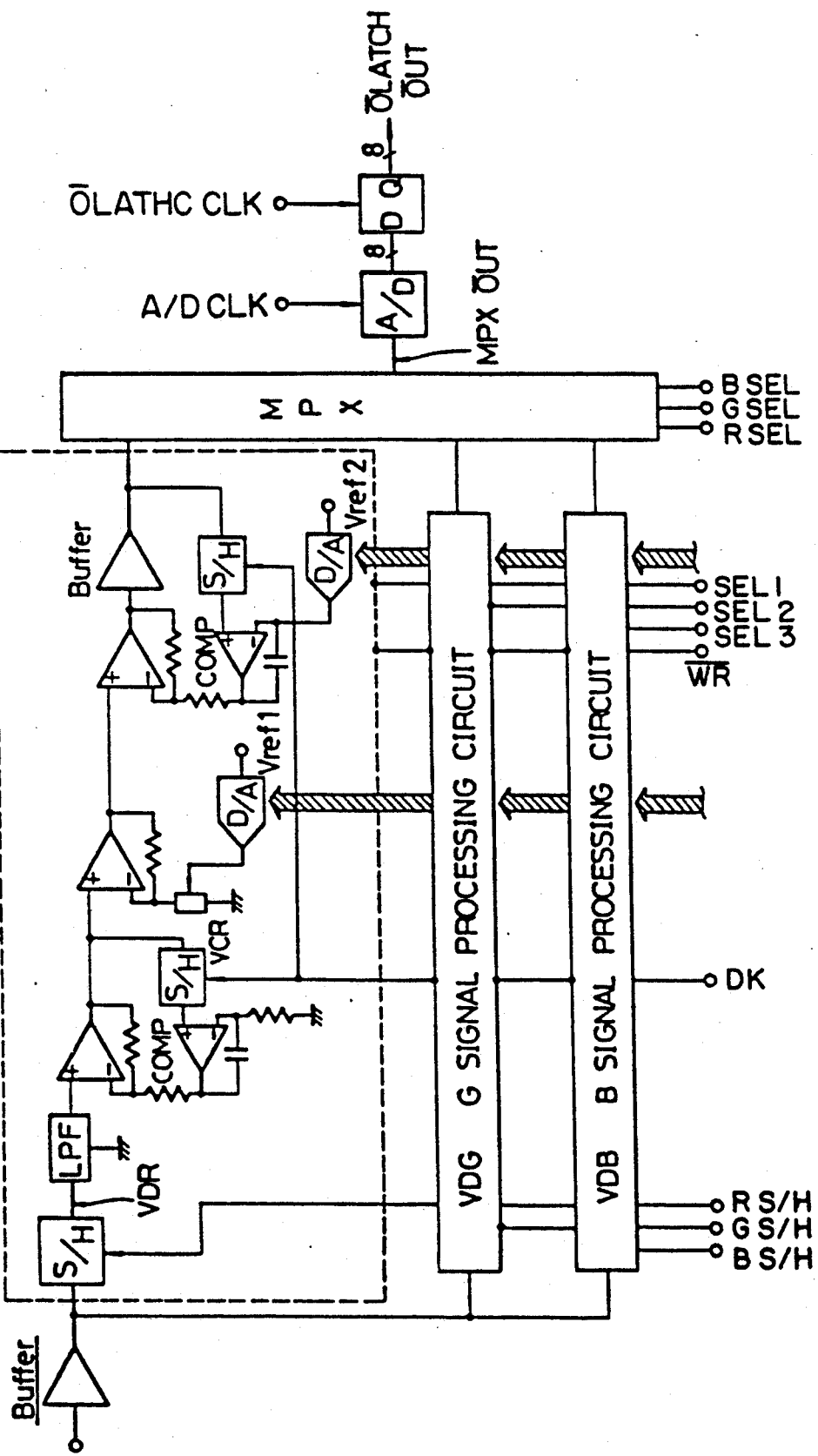
FIG. 1 is a block diagram showing a conventional example of one channel of an analog signal processing circuit.
Figure 2B:
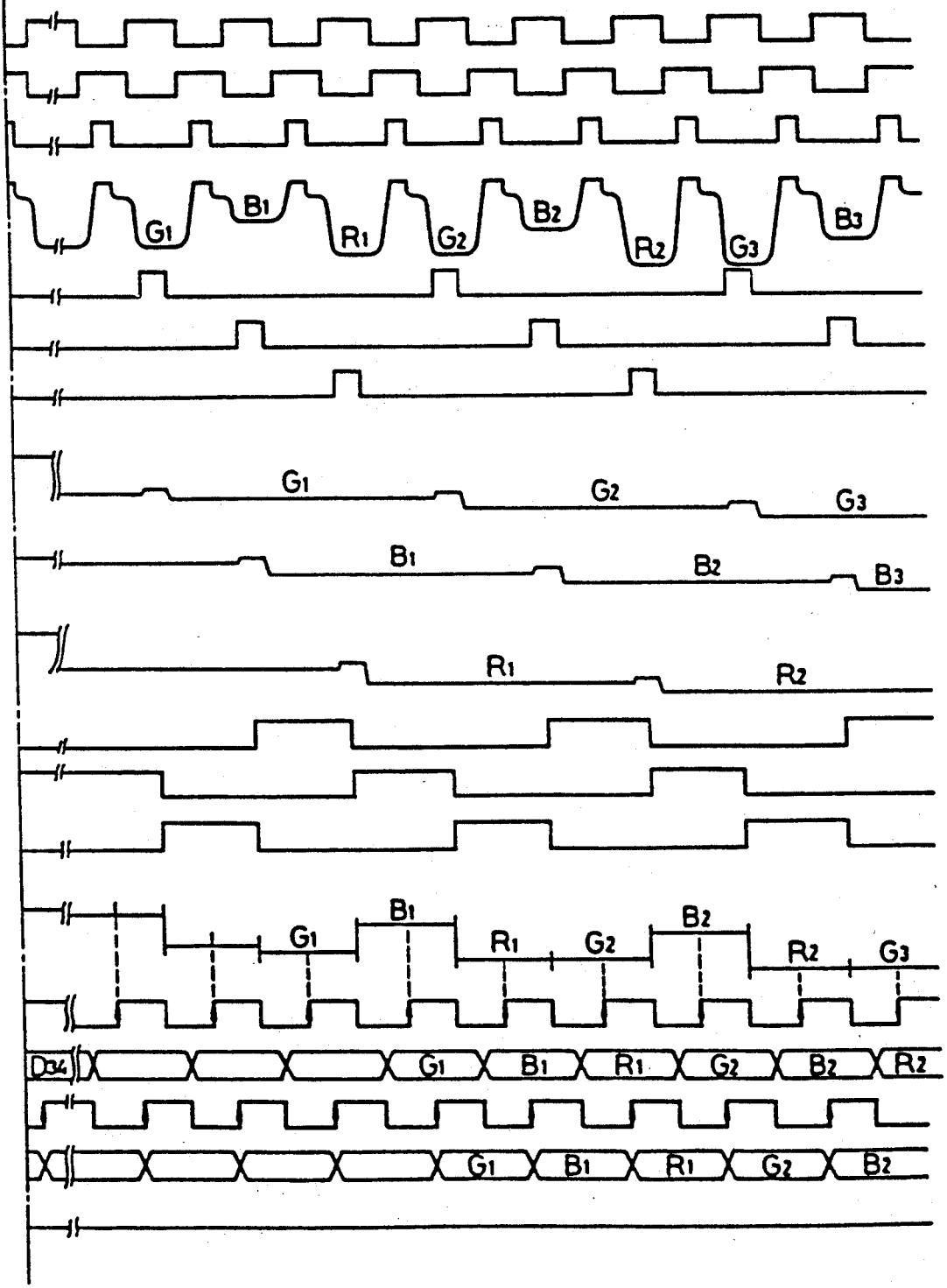
FIG. 2, consisting of FIGS. 2a and 2b, is a signal timing chart of each section in FIG. 1.

It is certified that error appears in the above-indentified patent and that said Letters Patent is hereby corrected as shown below:

On drawing sheet
SHEET 1 - FIGURE 1

"$\bar{\text{O}}$LATHC CLK" should read --$\bar{\text{O}}$LATCH CLK--.

On title page, item
[56] REFERENCES CITED
U.S. PATENT DOCUMENTS

"Hieder" should read --Hieda--.

COLUMN 1

Line 8, "now abandoned" should be deleted.

COLUMN 3

Line 29, "generator 6." should read --generator 16.--.

COLUMN 4

Line 64, "(FIG." should read --FIG.--.
Line 65, "in" should read --(in--.

UNITED STATES PATENT AND TRADEMARK OFFICE
CERTIFICATE OF CORRECTION

PATENT NO. : 5,185,659
DATED : February 9, 1993
INVENTOR(S) : HIROSHI ITAGAKI, ET AL.

It is certified that error appears in the above-indentified patent and that said Letters Patent is hereby corrected as shown below:

COLUMN 5

Line 26, "hand" should read --hand,--.
Line 39, "$V_{out} = -V_{ref1}/N\_(0<N<1)$" should read --$V_{out} = -V_{ref1}/N \ (0<N<1)$--.

COLUMN 6

Line 41, "rencee" should read --rence--.

COLUMN 7

Line 54, "subtractor," should read --subtracter--.

COLUMN 8

Line 30, "M$_i$n" should read --Min--.
Line 67, "$(R_{ON}+R_{VCRa})/(R_{ATT}+R_{ON}R_{VCRa})$" should read --$(R_{ON}+R_{VCRa})/(R_{ATT}+R_{ON}+R_{VCRa})$--.

COLUMN 9

Line 13, "the to an invention" should read --the invention to an--.

UNITED STATES PATENT AND TRADEMARK OFFICE
CERTIFICATE OF CORRECTION

PATENT NO. : 5,185,659         Page 3 of 3
DATED       : February 9, 1993
INVENTOR(S) : HIROSHI ITAGAKI, ET AL.

It is certified that error appears in the above-indentified patent and that said Letters Patent is hereby corrected as shown below:

COLUMN 10

Line 27, "object" should read --object of--.
Line 39, "$V_{out} = -V_{ref1}/N\_(0<N<1)$" should read --$V_{out} = -V_{ref1}/N$ (0<N<1)--.
Line 47, "$R_{VCR})$" should read --$(R_{VCR})$--.
Line 52, "$AV=1+Rf/R_{VCR}$" should read --$A_V=1+R\underline{f}/R_{VCR}$--.

COLUMN 11

Line 24, "numeral" should read --numerals--.
Line 33, "comprising," should read --comprising:--.

COLUMN 14

Line 55, "mean" should read --means--.

Signed and Sealed this

Twelfth Day of April, 1994

Attest:

BRUCE LEHMAN

Attesting Officer

Commissioner of Patents and Trademarks